(12) United States Patent
Misawa

(10) Patent No.: US 12,332,440 B2
(45) Date of Patent: *Jun. 17, 2025

(54) DISPLAY CONTROL DEVICE, DISPLAY CONTROL METHOD, AND DISPLAY CONTROL PROGRAM

(71) Applicant: FUJIFILM Corporation, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,781

(22) Filed: May 2, 2024

(65) Prior Publication Data

US 2024/0280815 A1 Aug. 22, 2024

Related U.S. Application Data

(63) Continuation of application No. 18/306,422, filed on Apr. 25, 2023, now Pat. No. 12,007,563, which is a (Continued)

(30) Foreign Application Priority Data

Oct. 27, 2020 (JP) .................................. 2020-179750

(51) Int. Cl.
  *G02B 27/01* (2006.01)
  *G06F 3/0485* (2022.01)
  *G06F 3/0488* (2022.01)

(52) U.S. Cl.
  CPC ....... *G02B 27/017* (2013.01); *G02B 27/0101* (2013.01); *G06F 3/0485* (2013.01); (Continued)

(58) Field of Classification Search
  CPC .. G02B 27/0101; G02B 27/017; G02B 27/02; G02B 2027/0138; G02B 2027/014; (Continued)

(56) References Cited

U.S. PATENT DOCUMENTS

| 11,409,091 B2 | 8/2022 | You et al. |
| 2015/0002434 A1 | 1/2015 | Tsukahara et al. |

(Continued)

FOREIGN PATENT DOCUMENTS

| JP | 2013-134532 A | 7/2013 |
| JP | 2019-105678 A | 6/2019 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2021/036534, dated May 11, 2023, with an English translation.

(Continued)

*Primary Examiner* — Nelson M Rosario
(74) *Attorney, Agent, or Firm* — Birch, Stewart, Kolasch & Birch, LLP

(57) ABSTRACT

A display control device of a wearable device including a monitor, the display control device including: a memory; and at least one processor that is coupled to or incorporates the memory, and that is configured to: acquire an image to be displayed on the monitor; acquire a first operation instruction that is input through operation of an operation unit of an imaging apparatus in order to change a display magnification of the image and that is input through a magnification changing operation performed at the imaging apparatus, the imaging apparatus being a separate body from the wearable device; and change the display magnification of the image in accordance with the first operation instruction.

7 Claims, 32 Drawing Sheets

Related U.S. Application Data continuation of application No. PCT/JP2021/036534, filed on Oct. 4, 2021.

(52) U.S. Cl.
CPC ...... *G06F 3/0488* (2013.01); *G02B 2027/014* (2013.01); *G06F 2203/04806* (2013.01)

(58) Field of Classification Search
CPC ...... G06F 3/01; G06F 3/0484; G06F 3/04845; G06F 3/0485; G06F 3/0488; G06F 3/04883; G06F 2203/04806
See application file for complete search history.

(56) References Cited

U.S. PATENT DOCUMENTS

| | | |
|---|---|---|
| 2016/0085403 A1 | 3/2016 | Koga |
| 2016/0088060 A1* | 3/2016 | Rahman ................ H04L 67/025 715/740 |
| 2016/0225192 A1 | 8/2016 | Jones et al. |
| 2018/0005607 A1 | 1/2018 | Tsukahara et al. |
| 2018/0181273 A1 | 6/2018 | Koga |
| 2018/0181274 A1* | 6/2018 | Jung ................ G02B 27/0176 |
| 2019/0146219 A1* | 5/2019 | Rodriguez, II ......... G06F 21/36 345/633 |
| 2019/0179406 A1 | 6/2019 | Manda et al. |
| 2020/0084385 A1 | 3/2020 | Oyama |
| 2020/0257439 A1 | 8/2020 | Ogawa |
| 2020/0386982 A1 | 12/2020 | Luxembourg |
| 2021/0306599 A1 | 9/2021 | Pierce |
| 2022/0039873 A1 | 2/2022 | Harris |

FOREIGN PATENT DOCUMENTS

| | | |
|---|---|---|
| JP | 2020-42064 A | 3/2020 |
| JP | 2020-129261 A | 8/2020 |
| WO | WO 2014/185146 A1 | 11/2014 |

OTHER PUBLICATIONS

International Search Report (Form PCT/ISA/210) for International Application No. PCT/JP2021/036534, dated Nov. 9, 2021, with an English translation.
Notice of Allowance issued in U.S. Appl. No. 18/306,422 on Mar. 18, 2024.
Office Action issued in U.S. Appl. No. 18/306,422 on Nov. 30, 2023.
Japanese Office Action for corresponding Japanese Application No. 2022-558947, dated Mar. 18, 2025, with an English translation.

* cited by examiner

DISPLAY CONTROL DEVICE, DISPLAY CONTROL METHOD, AND DISPLAY CONTROL PROGRAM

CROSS-REFERENCE TO RELATED APPLICATIONS

This application is a continuation application of U.S. application Ser. No. 18/306,422, filed on Apr. 25, 2023, which is a continuation application of International Application No. PCT/JP2021/036534, filed on Oct. 4, 2021, which are incorporated herein by reference in their entireties. Further, this application claims priority from Japanese Patent Application No. 2020-179750, filed on Oct. 27, 2020, the disclosure of which is incorporated by reference herein in its entirety.

BACKGROUND

Technical Field

The disclosed technology relates to a display control device, a display control method, and a non-transitory storage medium storing a display control program.

Related Art

In recent years, a wearable monitor such as a head mounted display (HMD) has been developed as a monitor to be mounted on a head part of a user. Furthermore, so-called smart glasses and the like that display information in front of eyes using a small liquid crystal display (LCD) projector unlike the HMD in the related art, and that are smaller and lighter than the HMD in the related art and are approximately in the same size or slightly larger than glasses in terms of appearance have emerged. The smart glasses can display a display image of a monitor in a superimposed manner on transmitted light or in a part of a field of view. These types of wearable monitors are considered to be the mainstream in the future. Such wearable monitors are an example of a wearable device including a monitor. A display control device that can scroll an image in a case of displaying a captured image obtained using an imaging apparatus on the monitor of the wearable device has been suggested (for example, refer to WO2014/185146A). In WO2014/185146A, scrolling an image displayed on a monitor of a wearable device in accordance with an inclination of a smartphone is disclosed.

SUMMARY

The disclosed technology provides a display control device, a display control method, and a non-transitory storage medium storing a display control program that improve usability. A display control device according to an aspect of the present disclosure is a display control device of a wearable device including a monitor, the display control device comprising at least one processor, and a memory that is incorporated in or connected to the processor, in which the processor is configured to execute image acquisition processing of acquiring an image to be displayed on the monitor, first operation instruction acquisition processing of acquiring a first operation instruction that is input through operation of an operation unit of an imaging apparatus which is a separate body from the wearable device, in order to change a display magnification of the image and that is input through a magnification changing operation in the imaging apparatus, and display control processing of changing the display magnification of the image in accordance with the first operation instruction.

The magnification changing operation may be a zoom magnification changing operation performed in a case of imaging using the imaging apparatus.

In addition, the processor may be configured to control an amount of change in the display magnification of the image in accordance with an amount of change in magnification with respect to an operation amount of the magnification changing operation in the display control processing.

In addition, the processor may be configured to further execute second operation instruction acquisition processing of acquiring, as a second operation instruction, a change in a posture of the imaging apparatus detected by a posture detection unit that detects the posture of the imaging apparatus, and scroll the image in accordance with the second operation instruction in the display control processing.

In addition, in a case where the imaging apparatus includes a touch panel functioning as the operation unit, and the magnification changing operation in a case of imaging of the imaging apparatus is a swipe operation within a first region in the touch panel, the processor may be configured to detect, as an operation of changing the display magnification of the image, a swipe operation within a second region that includes the first region and that is wider than the first region in the touch panel.

In addition, the processor may be configured to detect, as the magnification changing operation, a swipe operation of an arc shape of which a radius is greater than or equal to 3 cm and less than or equal to 8 cm in the touch panel.

In addition, the image may be an image captured by the imaging apparatus.

In addition, the processor may be mounted in the wearable device, and the processor may be configured to acquire the image from an external server in the image acquisition processing, and acquire the first operation instruction, which is input through the operation of the operation unit of the imaging apparatus, through the server in the first operation instruction acquisition processing.

In addition, the processor may be mounted in the wearable device, and the processor may be configured to acquire the image from an external server in the image acquisition processing, and acquire the first operation instruction, which is input through the operation of the operation unit of the imaging apparatus, directly from the imaging apparatus in the first operation instruction acquisition processing.

In addition, the image may include information about a tilt angle that is an inclination angle of the imaging apparatus with respect to a horizontal direction in capturing the image, and the processor may be configured to change an initial position of a center position in a case of changing the display magnification of the image based on the tilt angle in the display control processing.

In addition, the image may include information about a roll angle that is a rotation angle of the imaging apparatus about an optical axis with respect to a horizontal direction in capturing the image, and the processor may be configured to correct the image with respect to the horizontal direction based on the roll angle in the display control processing.

In addition, the image may include magnification changing operation-related information related to an amount of change in magnification with respect to an operation amount of the magnification changing operation in a case of imaging in the imaging apparatus that has captured the image, and the processor may be configured to match the amount of change in the magnification with respect to the operation amount of the magnification changing operation in imaging to an amount of change in magnification with respect to an operation amount in a case of changing the display magnification of the image, based on the magnification changing operation-related information in the display control processing.

In addition, the image may include angle-of-view information related to an angle of view of the imaging apparatus in capturing the image, and the processor may be configured to correct a scroll amount in a case of scrolling the image in accordance with the second operation instruction based on the angle-of-view information in the display control processing.

A display control method according to another aspect of the present disclosure is a display control method of a wearable device including a monitor, the display control method comprising an image acquisition processing step of acquiring an image to be displayed on the monitor, a first operation instruction acquisition processing step of acquiring a first operation instruction that is input through operation of an operation unit of an imaging apparatus which is a separate body from the wearable device, in order to change a display magnification of the image and that is input through a magnification changing operation in the imaging apparatus, and a display control processing step of changing the display magnification of the image in accordance with the first operation instruction.

A non-transitory storage medium according to still another aspect of the present disclosure stores a program for executing display control processing by a wearable device including a monitor, the display control processing including: acquiring an image to be displayed on the monitor, acquiring a first operation instruction that is input through operation of an operation unit of an imaging apparatus which is a separate body from the wearable device, in order to change a display magnification of the image and that is input through a magnification changing operation in the imaging apparatus, and changing the display magnification of the image in accordance with the first operation instruction.

DETAILED DESCRIPTION

First Embodiment

Figure 1:
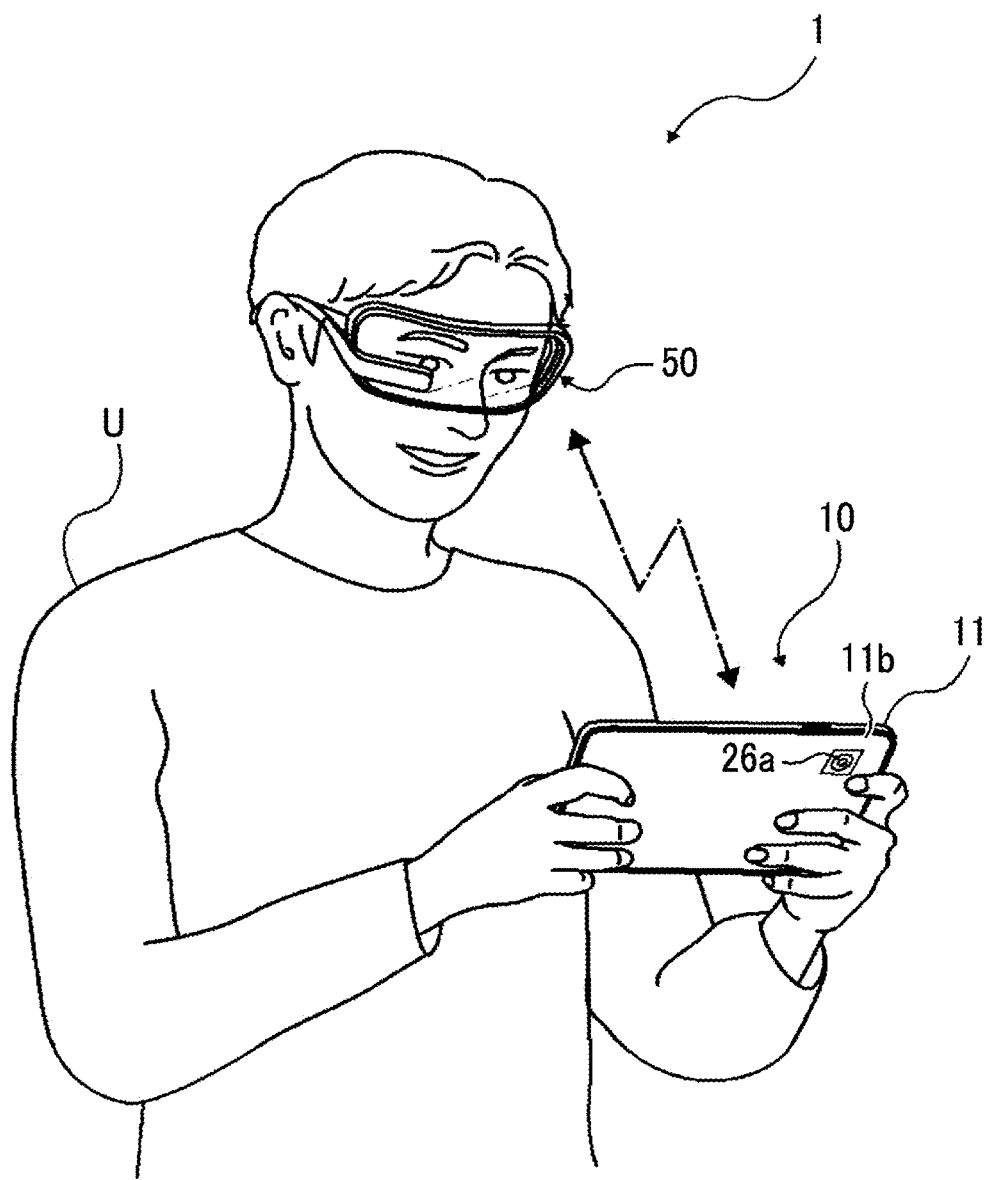
FIG. 1 is a schematic configuration diagram of an image display system including a display control device according to a first embodiment.

Hereinafter, embodiments of the present disclosure will be described with reference to the drawings. FIG. 1 is a schematic configuration diagram of an image display system including a display control device according to a first embodiment of the present disclosure. An image display system 1 illustrated in FIG. 1 comprises a smartphone 10 and smart glasses 50. The smart glasses 50 are caused to function as an external display of the smartphone 10 so that an image displayable on the smartphone 10 can be displayed on the smart glasses 50. In the image display system 1, as will be illustrated below, changing of a display magnification and scrolling of an image displayed on the smart glasses 50 can be performed by operating the smartphone 10.

As illustrated in FIG. 1, in the image display system 1, the smartphone 10 and the smart glasses 50 are wirelessly connected as an example. The smartphone 10 is an example of an imaging apparatus according to an embodiment of the disclosed technology. The smart glasses 50 are a glasses-type wearable computer and are a so-called wearable monitor. The wearable monitor is an example of a wearable device that is mounted on a body of a user U and that includes a monitor on which an image is displayed within a field of view of the user U.

As is well known, the smartphone 10 is a portable terminal that functions as a mobile computer and as a mobile phone. The smartphone 10 comprises a housing 11 of a flat plate shape. A touch panel 24 is disposed on one surface of the housing 11. An imaging lens 26a is disposed on a surface 11b of the housing 11 on an opposite side to the surface on which the touch panel 24 is disposed. In the following description, for convenience, in the housing 11 of the smartphone 10, the surface on which the touch panel 24 is disposed will be described as a front surface 11a (refer to FIG. 8), and the surface on which the imaging lens 26a is disposed will be described as the rear surface 11b.

Figure 2:
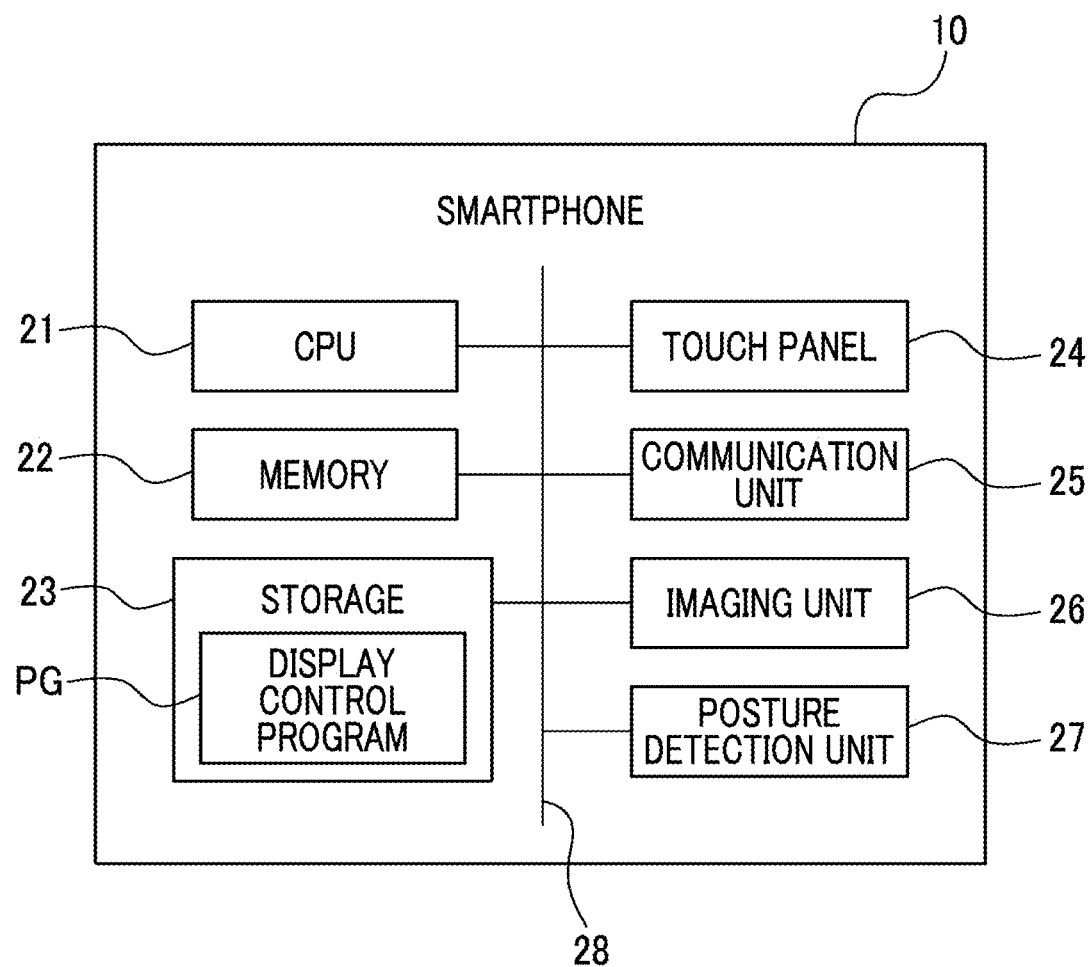
FIG. 2 is a block diagram illustrating a hardware configuration of a smartphone.

As illustrated in FIG. 2, the smartphone 10 includes a central processing unit (CPU) 21, a memory 22, a storage 23, the touch panel 24, a communication unit 25, an imaging unit 26, and a posture detection unit 27. Each configuration is mutually communicably connected through a bus 28.

The CPU 21 integrally controls each part of the smartphone 10 by executing a control program or the like. The memory 22 is a work memory and is composed of, for example, a random access memory (RAM). The CPU 21 reads out the control program into the memory 22 from the storage 23 and executes the control program using the memory 22 as a work region. The CPU 21 controls each configuration and performs various types of processing in accordance with the control program.

The CPU 21 is an example of a processor according to the embodiment of the disclosed technology. The memory 22 is an example of a memory according to the embodiment of the disclosed technology. The smartphone 10 comprising the CPU 21 and the memory 22 also functions as a display control device according to the embodiment of the disclosed technology.

The storage 23 stores various programs including the control program including an operating system, an application program, and the like and various types of data including image data. The storage 23 is composed of, for example, a non-volatile memory such as a flash memory. In the present embodiment, the storage 23 stores a display control program PG as one of the various programs.

The touch panel 24 has a function as a display unit that displays various images, and a function as an operation unit that receives a touch input operation.

The communication unit 25 is an interface for communication of the smartphone 10 with the smart glasses 50 and with other apparatuses and, for example, uses standards such as Wi-Fi (registered trademark) and Bluetooth (registered trademark).

The imaging unit 26 comprises the imaging lens 26a and an imaging element and the like, not illustrated. The imaging unit 26 acquires image data of a subject by imaging the subject.

The posture detection unit 27 detects a posture of the smartphone 10 and, for example, uses a gyro sensor.

Figure 3:
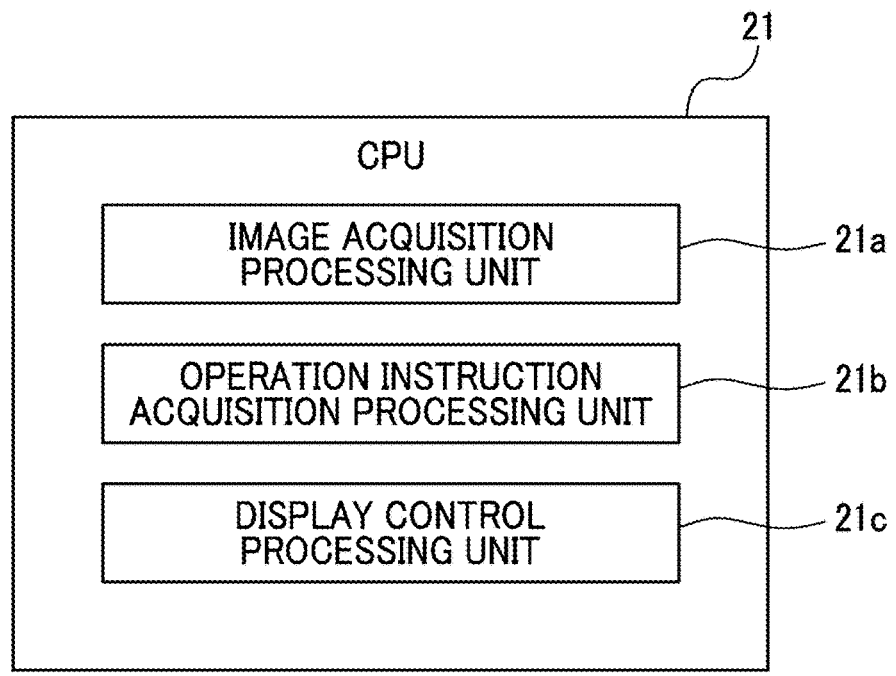
FIG. 3 is a functional block diagram of the smartphone.

As illustrated in FIG. 3, the CPU 21 functions as an image acquisition processing unit 21a, an operation instruction acquisition processing unit 21b, and a display control processing unit 21c by executing the display control program PG stored in the storage 23.

The image acquisition processing unit 21a executes image acquisition processing of acquiring an image to be displayed on the smart glasses 50.

The operation instruction acquisition processing unit 21b executes first operation instruction acquisition processing of acquiring a first operation instruction that is input through operation of the operation unit of the smartphone 10 which is a separate body from the smart glasses 50, in order to change a display magnification of the image and that is input through a magnification changing operation in the smartphone 10. As an example, the first operation instruction is the same operation as a zoom magnification changing operation in a case of imaging using the smartphone 10 and is a swipe operation in the touch panel 24.

In addition, the operation instruction acquisition processing unit 21b executes second operation instruction acquisition processing of acquiring, as a second operation instruction, a change in the posture of the smartphone 10, that is, a change in direction of the imaging lens 26a of the smartphone 10, detected by the posture detection unit 27 that detects the posture of the smartphone 10.

The display control processing unit 21c executes processing of changing the display magnification of the image displayed on the smart glasses 50 in accordance with the first operation instruction. In addition, the display control processing unit 21c executes processing of scrolling the image displayed on the smart glasses 50 in accordance with the second operation instruction.

Figure 4:
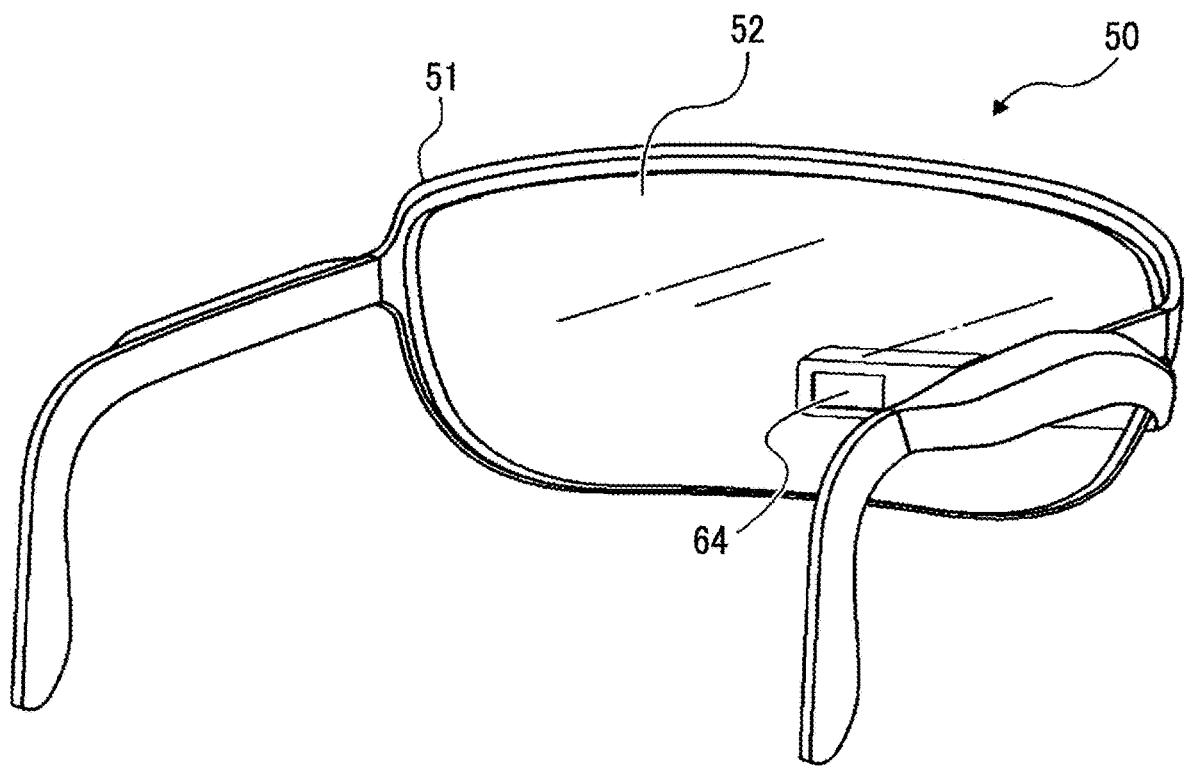
FIG. 4 is an external view of smart glasses.
Figure 5:
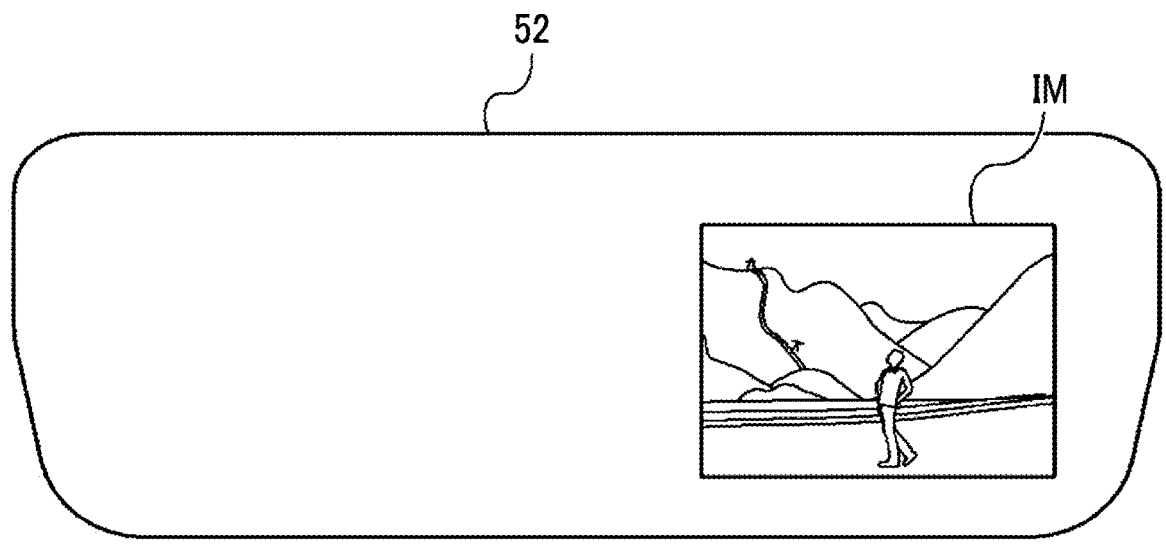
FIG. 5 is a diagram for describing a field of view of a user seen through the smart glasses.

As illustrated in FIG. 4, the smart glasses 50 are a glasses-type wearable monitor and comprise a frame 51, a lens 52 that is disposed in front of eyes and that has a size covering both eyes, and a display unit 64 disposed at a position corresponding to the right eye in the lens 52. As an example, the display unit 64 is a retinal projection-type display unit that displays an image IM in a part of a field of view of the right eye as illustrated in FIG. 5 by directly projecting display light of the image to a retina. FIG. 5 schematically illustrates a state where the image IM is captured in the field of view of the user U wearing the smart glasses 50. For the user U, the image IM looks as if the image IM is projected to the lens 52.

Figure 6:
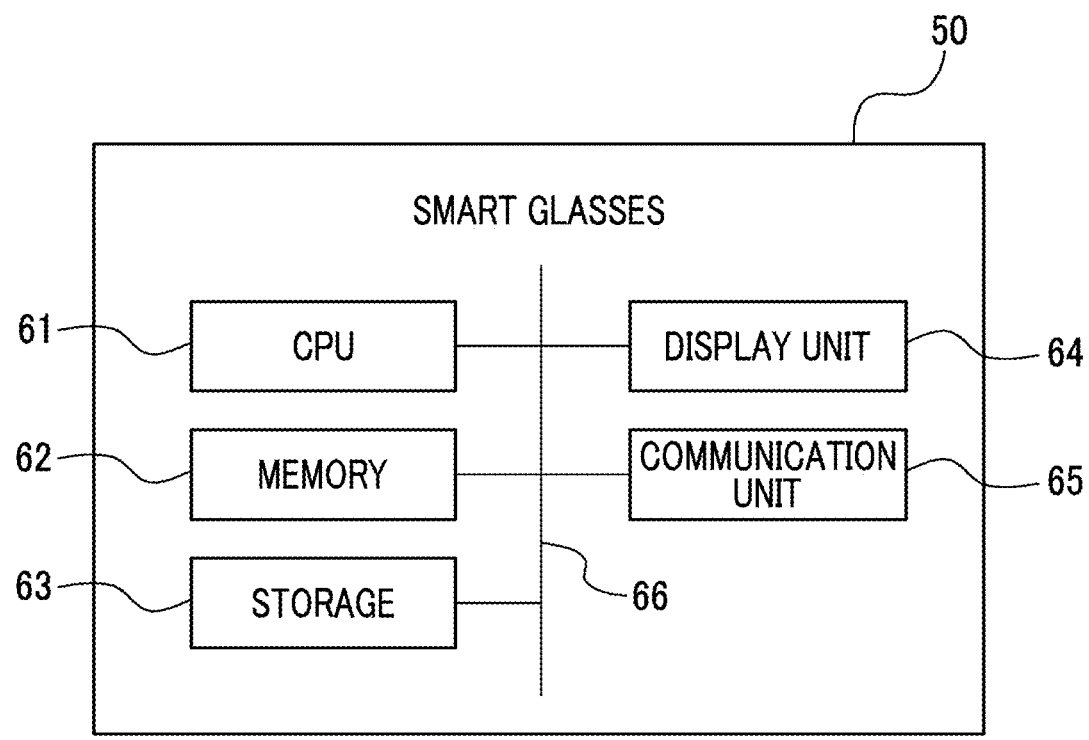
FIG. 6 is a block diagram illustrating a hardware configuration of the smart glasses.

As illustrated in FIG. 6, the smart glasses 50 include a CPU 61, a memory 62, a storage 63, the display unit 64, and a communication unit 65. Each configuration is mutually communicably connected through a bus 66.

The CPU 61 controls each part of the smart glasses 50 by executing a control program or the like. The memory 62 is a work memory and is composed of, for example, a RAM. The storage 63 stores various programs and various types of data. The storage 63 is composed of, for example, a flash memory. The CPU 61 reads out the control program into the memory 62 from the storage 63 and executes the control program using the memory 62 as a work region. The CPU 61 controls each configuration and performs various types of processing in accordance with the control program.

The display unit 64 displays the image in a part of the field of view of the user U by projecting the display light of the image to pupils of the user U and comprises an image display element, a projection lens, and the like, not illustrated. A resolution of the image display element is, for example, 640 dots in a lateral direction and 360 dots in a vertical direction.

The communication unit 65 is an interface for communication of the smart glasses 50 with the smartphone 10 and with other apparatuses and, for example, uses standards such as Wi-Fi (registered trademark) and Bluetooth (registered trademark).

[Flow of Processing]

Figure 7:
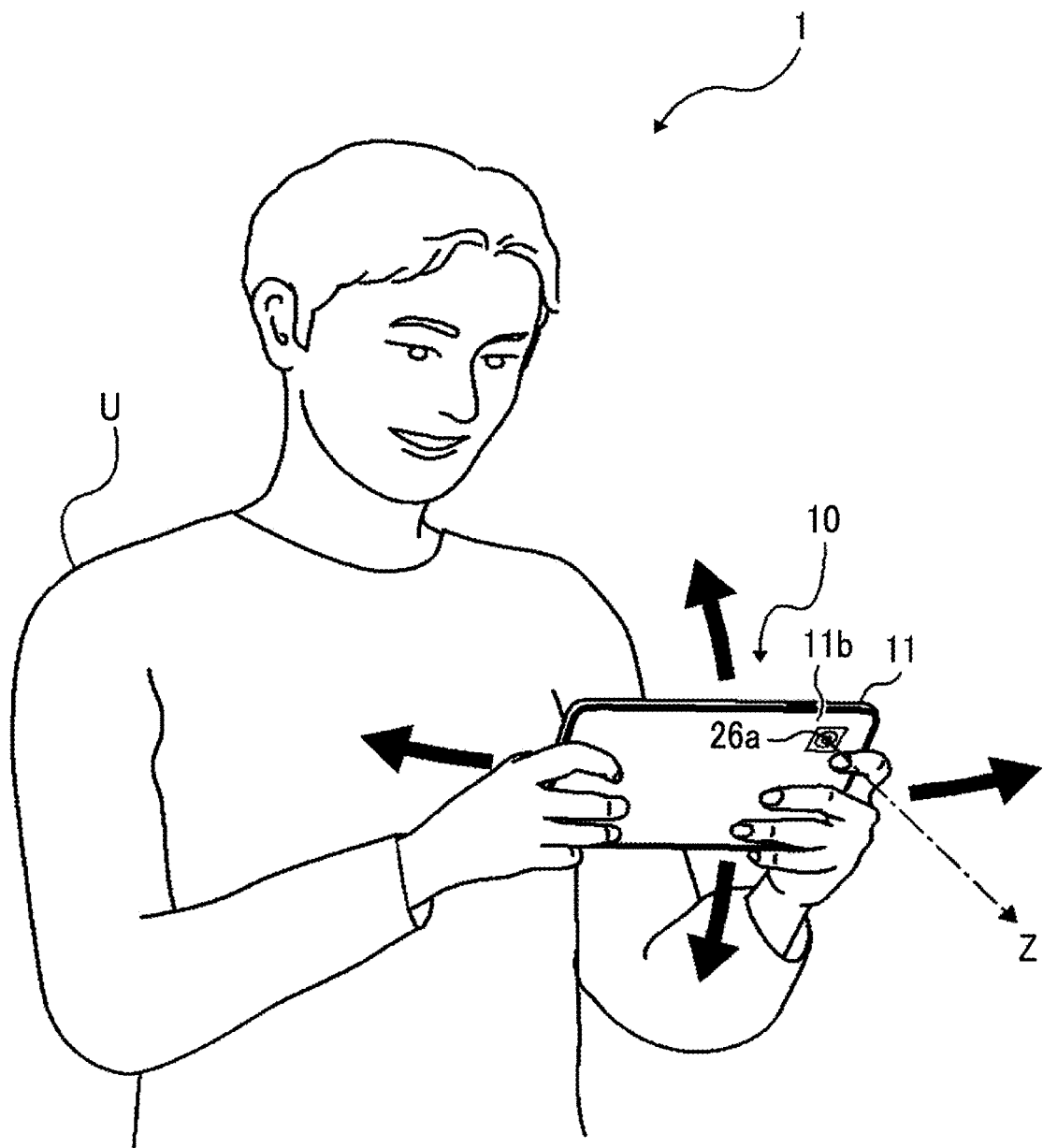
FIG. 7 is a diagram illustrating a state of the user in image capturing.

First, a flow of processing in a case where the user U captures an image using the smartphone 10 will be described. As illustrated in FIG. 7, in a case of capturing the image, as an example, the user U performs imaging using only the smartphone 10 without wearing the smart glasses 50.

Figure 8:
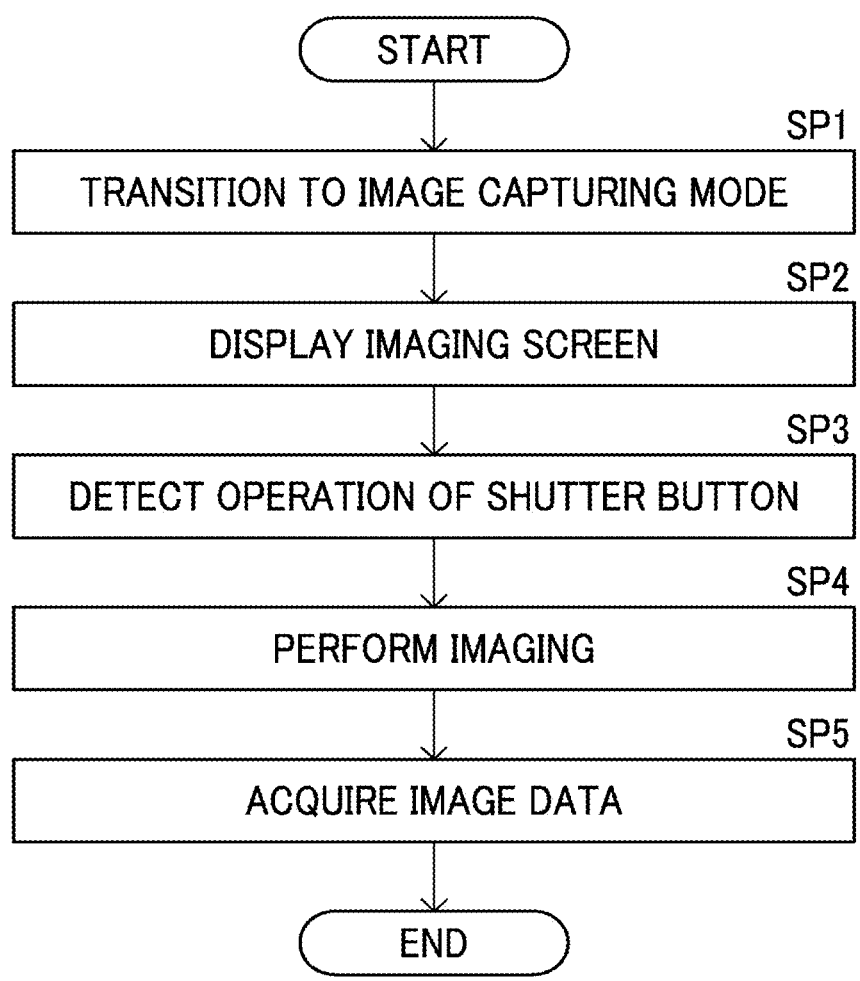
FIG. 8 is a flowchart for describing processing in the image capturing in the first embodiment.

FIG. 8 is a flowchart for describing the processing in a case of capturing the image using the smartphone 10.

In a case where an instruction such as a start instruction of a camera to set an image capturing mode is input from the user U, the CPU 21 of the smartphone 10 transitions to an image capturing mode (step SP1).

Figure 9:
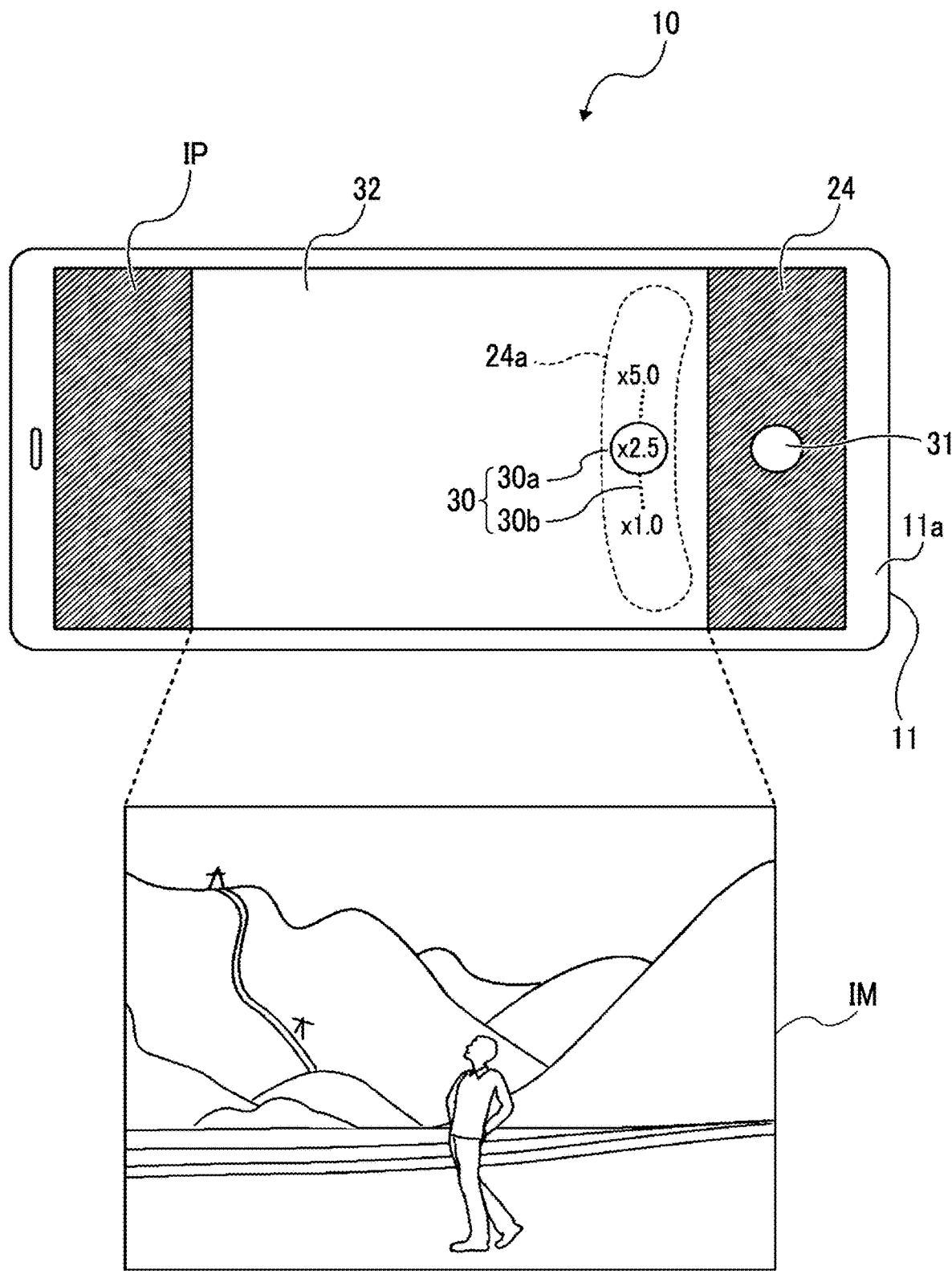
FIG. 9 is a diagram illustrating an example of an imaging screen displayed on a touch panel.

In a case where a transition is made to the image capturing mode, the CPU 21 displays an imaging screen IP (refer to FIG. 9) on the touch panel 24 (step SP2). As illustrated in FIG. 9, the imaging screen IP includes a zoom magnification input unit 30 that is a graphical user interface (GUI) for adjusting a zoom magnification, a shutter button 31, and a live view display unit 32. The image IM to be captured is displayed as a live view on the live view display unit 32. In FIG. 9, the image IM is illustrated outside a field of the live view display unit 32 in order to avoid complication of illustration. However, in actuality, the image IM is displayed within the live view display unit 32, and the image IM and the zoom magnification input unit 30 are displayed in a superimposed manner.

The zoom magnification input unit 30 comprises, for example, a magnification display unit 30a that displays the current zoom magnification, and a magnification designation line 30b for designating the zoom magnification from a wide angle end to a telephoto end. The zoom magnification is displayed based on a focal length at the wide angle end as a reference. That is, the zoom magnification at the wide angle end is the reference and thus, is a magnification of 1. The zoom magnification at the telephoto end is a magnification of 5 as an example. The magnification designation line 30b is a curved line of an arc shape. One end (a lower end in FIG. 9) of the magnification designation line 30b is the zoom magnification at the wide angle end and is set to a magnification of 1 in the present example. The other end (an upper end in FIG. 9) of the magnification designation line 30b is the zoom magnification at the telephoto end and is set to a magnification of 5 in the present example. In the magnification designation line 30b, the zoom magnification in an intermediate portion is set to a magnification of 1 to a magnification of 5 in accordance with a distance from the one end. In the present example, the magnification display unit 30a has a circular shape and approximately has a size that surrounds a number indicating the zoom magnification such as a magnification of 1 and a magnification of 5.

A display position of the magnification display unit 30a of a circular shape is fixed. On the other hand, the magnification designation line 30b moves along a path of an arc shape with respect to the magnification display unit 30a via the swipe operation of the user U. Numbers indicating the zoom magnification such as a magnification of 1 (×1.0) and a magnification of 5 (×5.0) displayed in both end parts of the magnification designation line 30b are movable together with the magnification designation line 30b. Moving the magnification designation line 30b via the swipe operation of the user U changes an intersection position of the magnification designation line 30b with respect to the magnification display unit 30a. The zoom magnification corresponding to the intersection position in the magnification designation line 30b is displayed within the magnification display unit 30a of a circular shape. In FIG. 9, a state where a magnification of 2.5 (×2.5) is displayed within the magnification display unit 30a is illustrated. Accordingly, the zoom magnification corresponding to the intersection position of the magnification designation line 30b with respect to the magnification display unit 30a is input.

A zoom magnification input region 24a is a region including the magnification display unit 30a and the magnification designation line 30b and is set to have an arc shape along the magnification designation line 30b that is a curved line of an arc shape. The zoom magnification input region 24a indicates a movement range in which a finger of the user U operating the zoom magnification input unit 30 moves. The zoom magnification input region 24a is a first region according to the embodiment of the disclosed technology.

The CPU 21 detects, as the zoom magnification changing operation performed in a case of imaging using the smartphone 10, the swipe operation of moving the magnification designation line 30b within the zoom magnification input region 24a in the touch panel 24. In a case where the zoom magnification changing operation is detected, the CPU 21 changes the zoom magnification of the imaging lens 26a or the zoom magnification of an electronic zoom. The image IM being displayed on the live view display unit 32 is zoomed in accordance with the change in the zoom magnification. That is, as the zoom magnification approaches the telephoto end, the subject within the image IM is enlarged, but an angle of view is narrowed. As the zoom magnification approaches the wide angle end, the subject within the image IM is reduced, but the angle of view is widened.

In addition, in the smartphone 10, an optical axis direction Z of the imaging lens 26a provided on the rear surface 11b of the housing 11 is an imaging direction of the image. The user U adjusts the imaging direction by moving the smartphone 10 to adjust the direction of the imaging lens 26a of the smartphone 10.

The user U adjusts the imaging direction and the zoom magnification and, in a case where the user U is ready to perform imaging, touches the shutter button 31. In a case where an operation of touching the shutter button 31 is detected (step SP3), the CPU 21 performs imaging by controlling the imaging unit 26 (step SP4) and acquires the image data (step SP5). The CPU 21 stores the image data acquired by the imaging unit 26 in the storage 23 and ends the processing.

Figure 10:
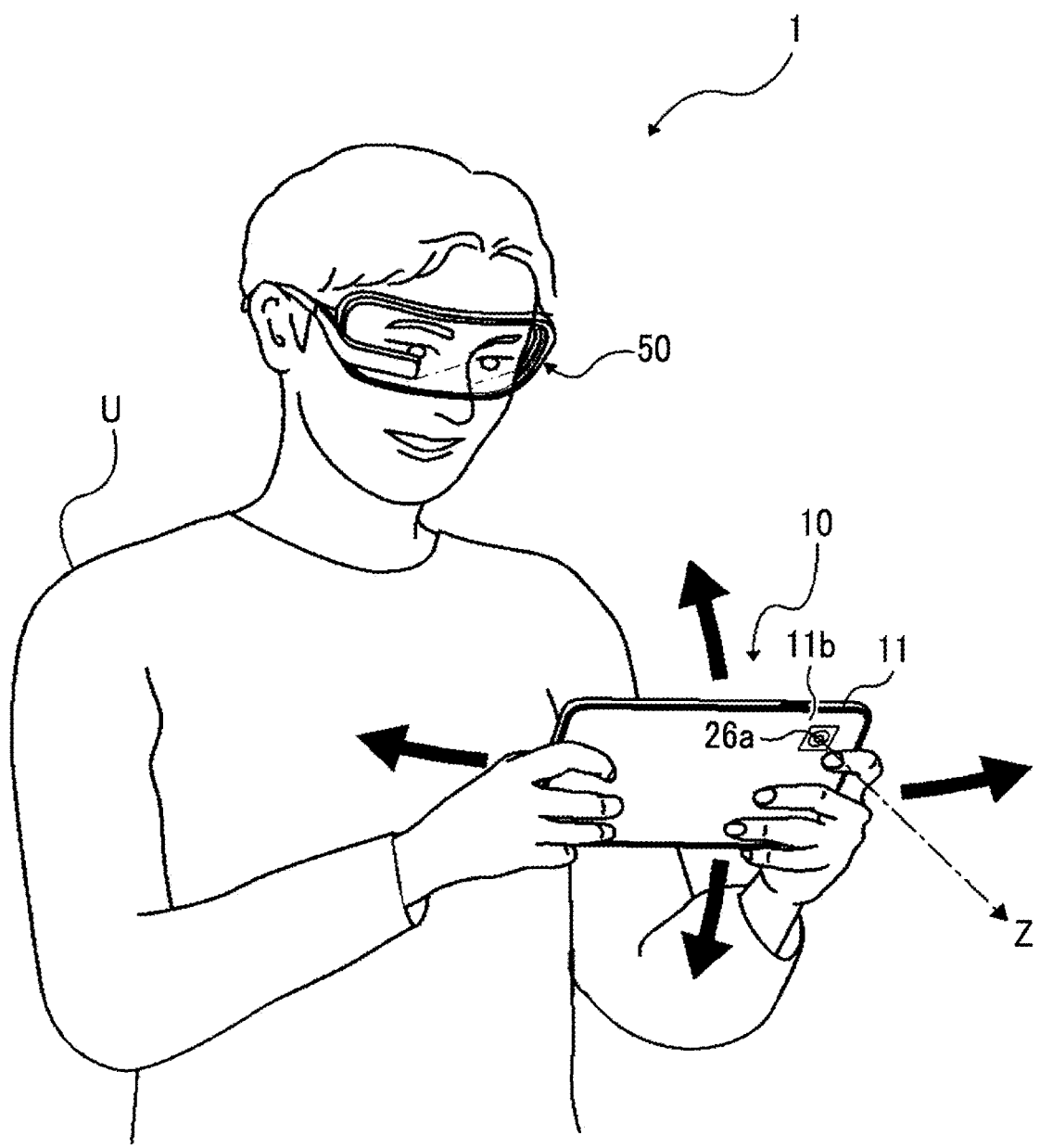
FIG. 10 is a diagram illustrating a state of the user in image display.

Next, a flow of processing in a case where the user checks the image in the image display system 1 will be described. As illustrated in FIG. 10, in a case where the user U checks the image IM via the smart glasses 50, the user U wears the smart glasses 50.

Figure 11:
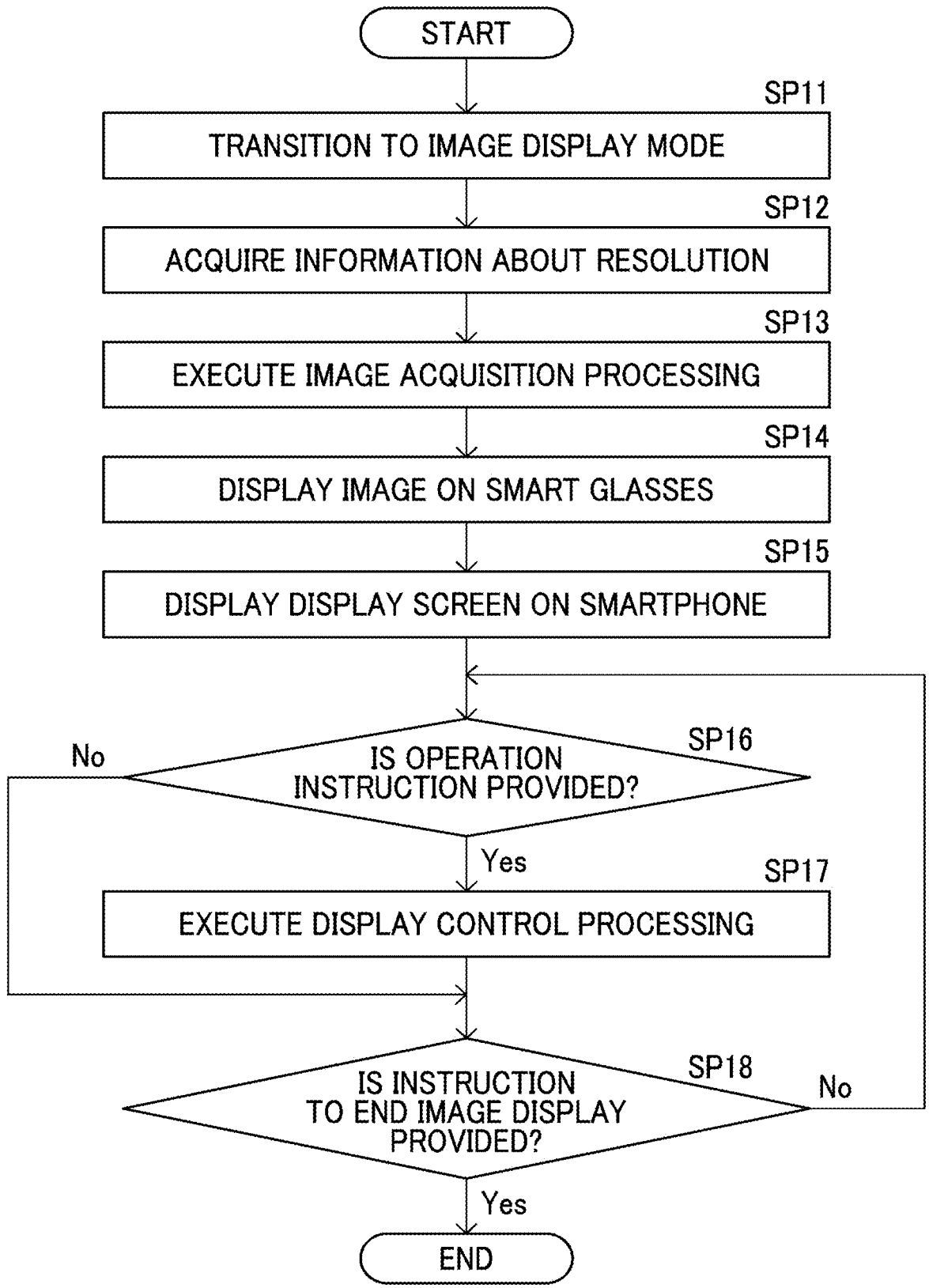
FIG. 11 is a flowchart for describing processing in the image display in the first embodiment.

FIG. 11 is a flowchart for describing processing in a case of image display in the image display system 1.

In a case where an instruction to set an image display mode is input from the user U, the CPU 21 of the smartphone 10 transitions to the image display mode (step SP11).

In a case where a transition is made to the image display mode, the CPU 21 acquires information about a resolution of the display unit 64 of the smart glasses 50 connected to the smartphone 10 (step SP12). For example, the information about the resolution of the display unit 64 is stored in the storage 23 together with model information of the smart glasses 50 in setting in a case of wirelessly connecting the smart glasses 50 to the smartphone 10. In a case where a transition is made to the image display mode, the CPU 21 acquires the information about the resolution of the display unit 64 by reading out the information from the storage 23.

In a case where the image to be displayed is designated by the user U from images captured by the smartphone 10, the CPU 21 executes the image acquisition processing of acquiring the image from the storage 23 (step SP13). Here, a case of displaying the image IM of a landscape in which a person is captured as illustrated in FIG. 9 and the like will be described as an example. A resolution of the image IM captured by the smartphone 10 is 4096 dots in the lateral direction and 3072 dots in the vertical direction as an example.

In the present example, the resolution of the display unit 64 of the smart glasses 50 is lower than the resolution of the image IM. Thus, the CPU 21 adjusts the resolution of the image IM in accordance with the resolution of the display unit 64 of the smart glasses 50. Adjustment of the resolution of the image IM is equivalent to adjustment of an image size. In an initial state, the image IM has a size in which the entire image IM falls within the entire screen of the display unit 64. The CPU 21 adjusts the image IM to the image size of the initial state and displays the image IM on the smart glasses 50 (step SP14).

Figure 12:
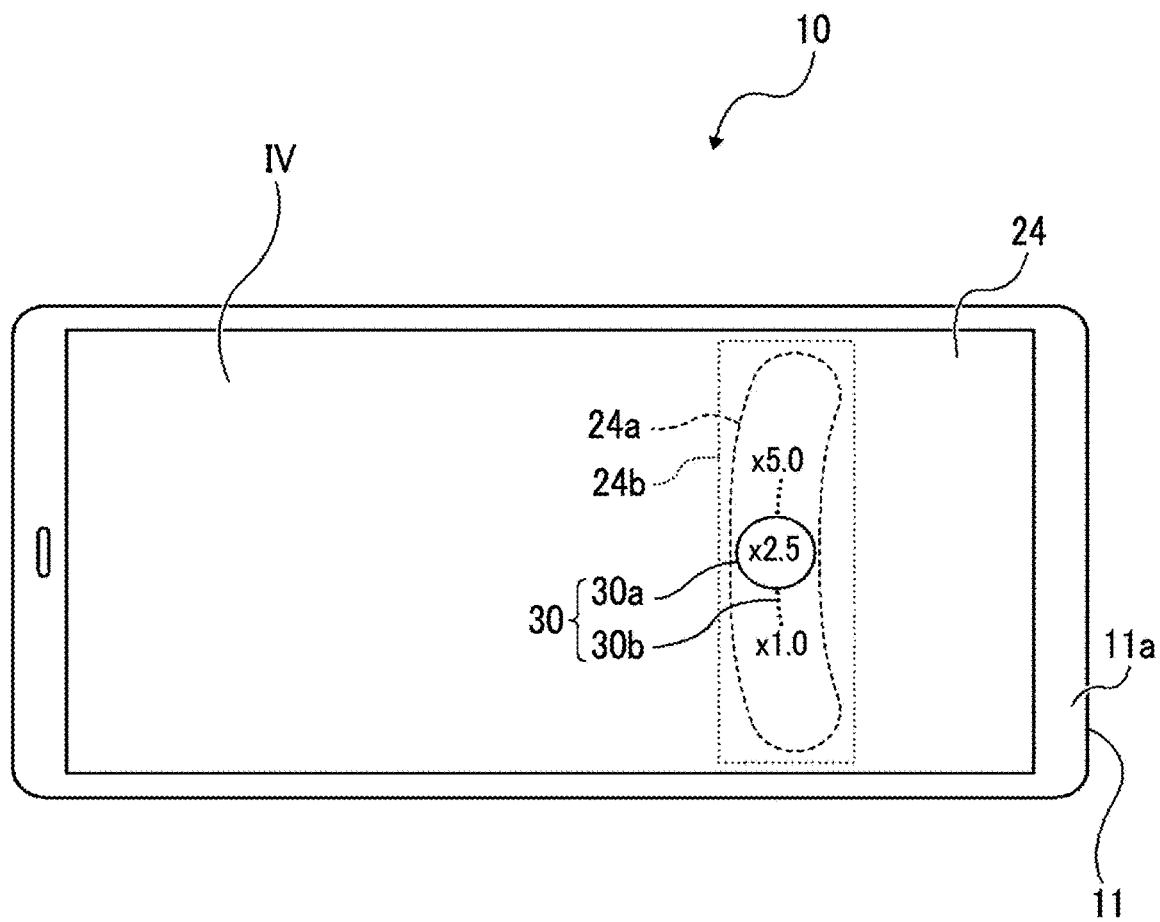
FIG. 12 is a diagram illustrating an example of a display screen displayed on the touch panel.

Next, as illustrated in FIG. 12, the CPU 21 of the smartphone 10 displays a display screen IV on the touch panel 24 for a state where the first operation instruction for changing the display magnification of the image IM displayed on the smart glasses 50 and the second operation instruction for scrolling the image IM are received from the user U (step SP15). The display screen IV is an operation screen displayed on the touch panel 24 in a case of displaying the image IM on the smart glasses 50.

In the present example, an example in which the image IM is not displayed on the display screen IV of the smartphone 10, and in which the image IM is displayed on only the smart glasses 50 will be described. In a case of displaying the image IM on the smart glasses 50, the image IM may also be displayed on the display screen IV.

In a case where the first operation instruction for changing the display magnification of the image IM or the second operation instruction for scrolling the image IM is input through the display screen IV (a Yes determination in step SP16), the CPU 21 acquires the input operation instruction. Step SP16 is an example of operation instruction acquisition processing of acquiring the first operation instruction or the second operation instruction. Next, the CPU 21 executes display control processing of changing of the display magnification and scrolling of the image IM in accordance with the acquired operation instruction, generates the image IM of which a display aspect is changed, and displays the image IM on the smart glasses 50 (step SP18).

The processing of changing of the display magnification and scrolling of the image IM (steps SP16 to SP18) is repeated until an instruction to end the image display is input from the user U.

After checking of the image IM ends, the user U inputs the instruction to end the image display into the smartphone 10. For example, the input of the instruction to end the image display is provided by a physical button, not illustrated, provided in the smartphone 10 or by a return button, not illustrated, in the touch panel 24. In a case where the instruction to end the image display is input (a Yes determination in step SP19), the CPU 21 stops displaying the image IM and ends the processing.

In addition, in a state where the display screen IV is displayed (step SP15), and then, none of the operation instructions for changing of the display magnification and scrolling of the image IM is input (a No determination in step SP16), in a case where the instruction to end the image display is input (a Yes determination in step SP19), the CPU 21 stops displaying the image IM in the initial state and ends the processing.

Here, processing in changing of the display magnification and processing in scrolling of the image IM will be individually described in detail.

First, changing of the display magnification of the image IM will be described. As illustrated in FIG. 12, the zoom magnification input unit 30 is displayed on the display screen IV. In the image display mode, the zoom magnification input unit 30 is displayed as an operation unit for changing the display magnification of the image IM. For example, the zoom magnification input unit 30 is displayed at almost the same position as the imaging screen IP. Accordingly, the magnification changing operation for changing the display magnification can be performed by the same operation as the zoom magnification changing operation performed in a case of imaging.

A magnification input region 24b is a region in which an input of the magnification changing operation for changing the display magnification is received. The magnification input region 24b is set to have a rectangular shape wider than the zoom magnification input region 24a. The magnification input region 24b is a second region according to the embodiment of the disclosed technology.

The CPU 21 detects, as the magnification changing operation for changing the display magnification, the swipe operation of moving the magnification designation line 30b within the magnification input region 24b in the touch panel 24. At this point, in a case where a finger is brought into contact with a position separated from the magnification designation line 30b within the magnification input region 24b, the CPU 21 handles the finger as being in contact with the closest position in the magnification designation line 30b from the contact position of the finger and detects the swipe operation with respect to the magnification designation line 30b as the magnification changing operation.

Figure 13:
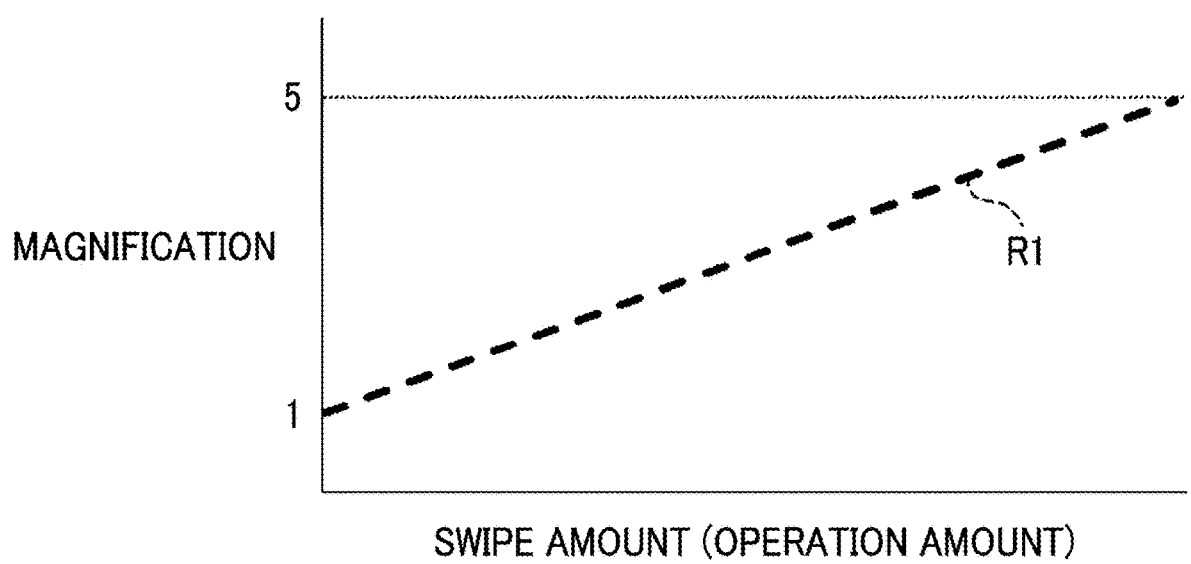
FIG. 13 is a graph showing a relationship between a swipe amount and a magnification in a zoom magnification changing operation and in a display magnification changing operation.

FIG. 13 is a graph showing a relationship between a swipe amount (that is, an operation amount) and a magnification in the magnification changing operation. A state where a lower limit value of the magnification shown on the magnification designation line 30b of the zoom magnification input unit 30 is superimposed on the magnification display unit 30a is set as a reference position (that is, a swipe amount of 0), and a relationship between the swipe amount from the reference position and an amount of change in the zoom magnification is shown in a graph R1. In the zoom magnification input unit 30, as described above, the reference position indicates the zoom magnification (a magnification of 1) at the wide angle end in the image capturing mode. On the other hand, in the image display mode, the reference position indicates that the display magnification of the image IM is the same magnification (a magnification of 1). Display at the same magnification (a magnification of 1) is a state where the entire image IM of the initial state matching the resolution of the touch panel 24 is displayed on the smart glasses 50 as illustrated in FIG. 5.

In the graph R1, the magnification changes in proportion to the swipe amount. In the image capturing mode, in a case where the swipe operation is performed, the CPU 21 determines the zoom magnification corresponding to the swipe amount from the relationship shown in the graph R1. As the swipe amount is increased, the zoom magnification is increased. In the image display mode, in a case where the swipe operation is performed, the CPU 21 determines the display magnification corresponding to the swipe amount from the relationship shown in the graph R1. As the swipe amount is increased, the display magnification is increased. As the display magnification is increased, the image IM is displayed in an enlarged manner. The relationship between the operation amount and the magnification shown in the graph R1 is used for both of changing of the zoom magnification in the image capturing mode and changing of the display magnification in the image display mode. Thus, in a case where the swipe operation of the same swipe amount as the swipe operation in the image capturing mode is performed in the image display mode, the CPU 21 changes the display magnification of the image IM by the same amount as the amount of change in the zoom magnification in the image capturing mode.

Figure 14:
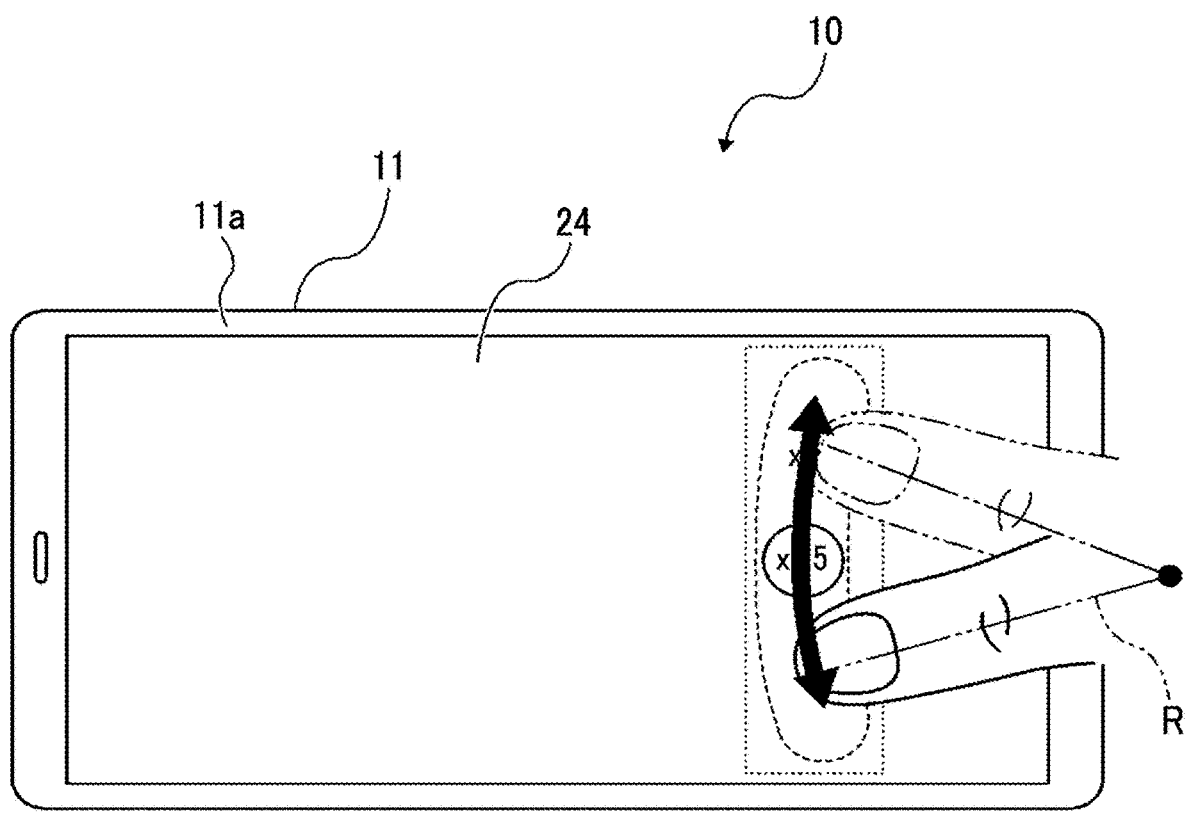
FIG. 14 is a diagram for describing a swipe operation on the display screen.

As illustrated in FIG. 14, the swipe operation for changing the magnification in the image display mode is the swipe operation of an arc shape and is the same as the zoom magnification changing operation in the image capturing mode. The CPU 21 detects the swipe operation of an arc shape as the magnification changing operation. For example, the swipe operation of an arc shape in the touch panel 24 is the swipe operation of an arc shape of which a radius is greater than or equal to 3 cm and less than or equal to 8 cm. This swipe operation has a shape and a range in which the operation can be comfortably performed in a case where the user U holds the smartphone 10 in a hand and performs the swipe operation with a thumb.

In a case where the swipe operation is input within the magnification input region 24*b* (refer to step SP16 in FIG. 11), the CPU 21 acquires the swipe operation as the first operation instruction.

The CPU 21 executes the display control processing of changing the display magnification of the image IM displayed on the smart glasses 50 in accordance with the zoom magnification changing operation which is the first operation instruction (refer to step SP17 in FIG. 11). At this point, the CPU 21 controls an amount of change in the display magnification of the image IM in accordance with the amount of change in the magnification with respect to the operation amount of the zoom magnification changing operation.

Figure 15:
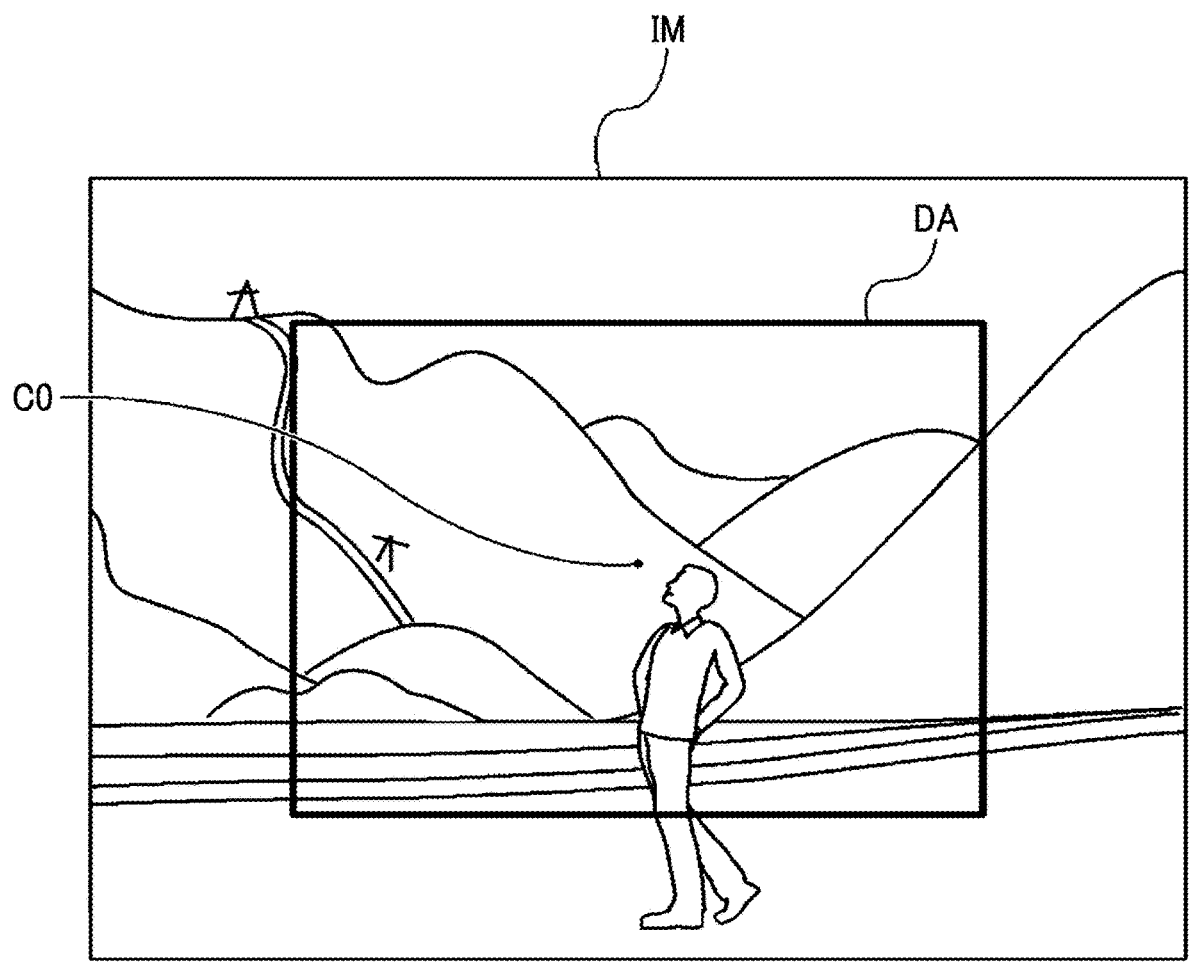
FIG. 15 is a diagram illustrating a state where an image displayed on the smart glasses is enlarged from an initial display state.

In addition, as an example, a center position in a case of changing the display magnification of the image IM is a center position of the image IM currently displayed on the smart glasses 50. As illustrated in FIG. 15, in the initial state, the center position of the entire image IM is an initial position C0 of the center position in a case of changing the display magnification. That is, in a case of enlarging the image IM in accordance with the display magnification, the image IM is enlarged with respect to the initial position C0 as a center. A region DA indicates a region displayed on the smart glasses 50 in a case where the image IM is enlarged with respect to the initial position C0 as a center.

The center position can be changed from the initial position C0. For example, the center position may be designatable by causing the user U to touch any position in the image IM. Accordingly, the image IM can be enlarged with respect to a region of interest for the user U in the image IM as a center.

Next, scrolling of the image IM will be described. In a state where the entire image IM is not displayed on the smart glasses 50 because of a change in the display magnification of the image IM, the image IM can be scrolled. For example, as illustrated in FIG. 15, in a case where the region DA that is a part of the image IM is displayed, the region DA displayed within the image IM can be changed by scrolling the image IM.

For scrolling, the user U designates a scroll direction by moving the smartphone 10 as in the case of imaging to adjust the direction of the imaging lens 26*a* of the smartphone 10. For example, in a case where the image IM is to be scrolled rightward, the direction of the imaging lens 26*a* of the smartphone 10 is inclined rightward from a reference direction. In addition, in a case where the image IM is to be scrolled upward, the direction of the imaging lens 26*a* of the smartphone 10 is inclined upward from the reference direction.

Regarding the reference direction, for example, the reference direction in a left-right direction is set to the direction of the imaging lens 26*a* of the smartphone 10 when a transition is made to the image display mode in step SP11 illustrated in FIG. 11. In addition, for example, the reference direction in an up-down direction is set to a direction in which the direction of the imaging lens 26*a* of the smartphone 10 is the horizontal direction.

The CPU 21 constantly monitors the posture of the smartphone 10 detected by the posture detection unit 27 and acquires a change in the posture of the smartphone 10 as the second operation instruction (refer to step SP16 in FIG. 11).

The CPU 21 executes the display control processing of scrolling the image IM displayed on the smart glasses 50 in accordance with the second operation instruction (step SP17).

Figure 16:
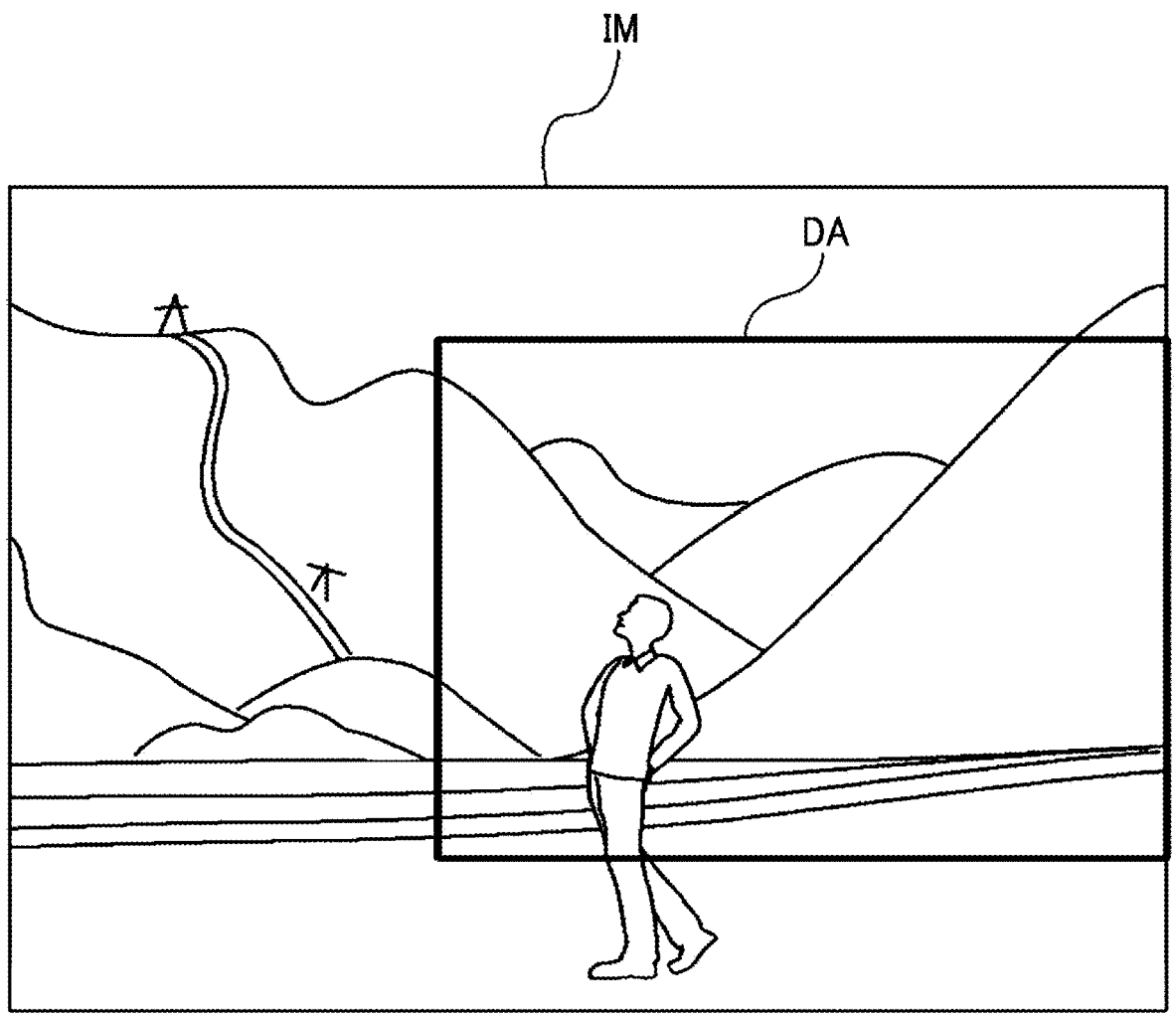
FIG. 16 is a diagram illustrating a state where the image displayed on the smart glasses is scrolled rightward from the state illustrated in FIG. 15.
Figure 17:
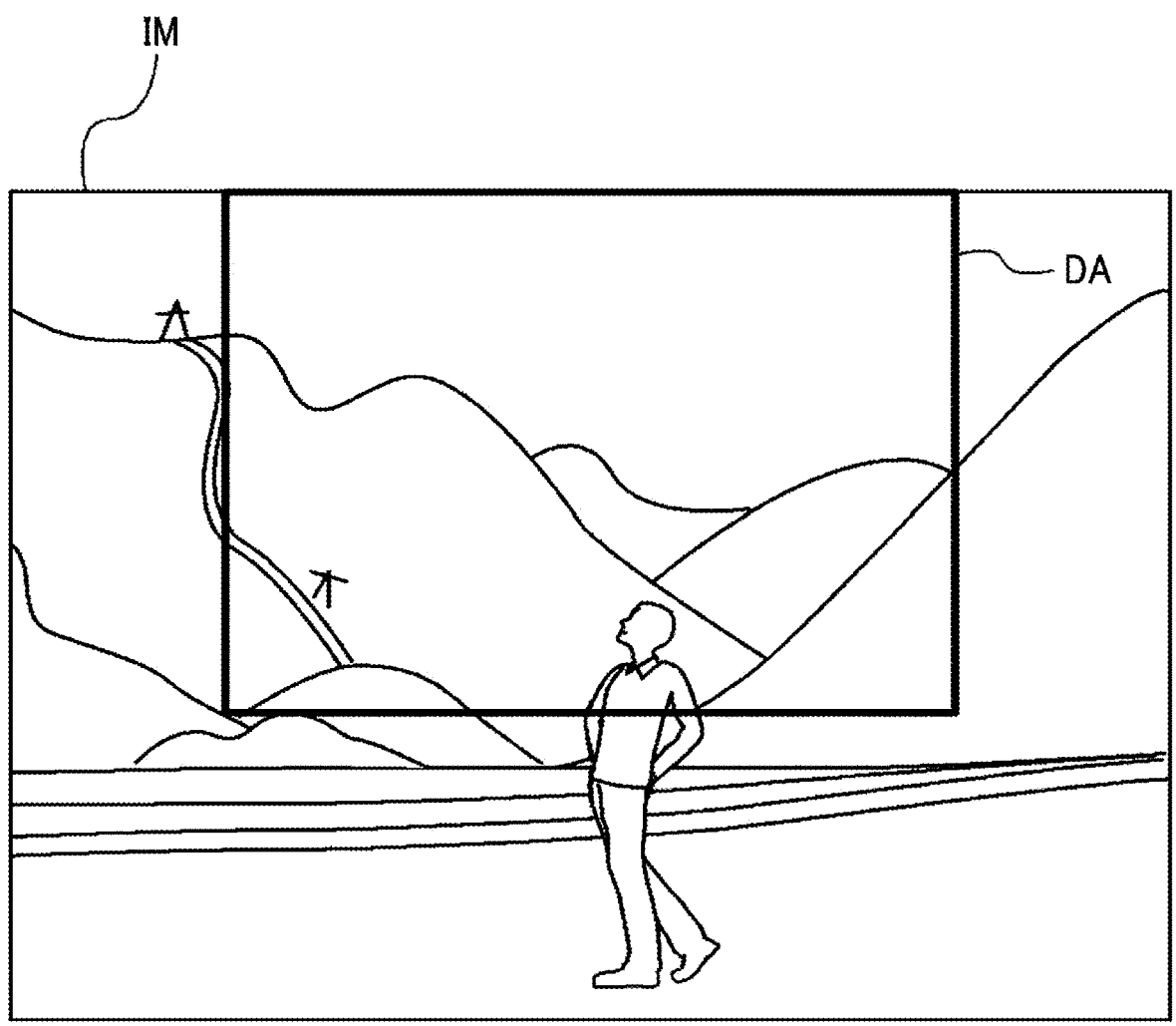
FIG. 17 is a diagram illustrating a state where the image displayed on the smart glasses is scrolled upward from the state illustrated in FIG. 15.

For example, in a case where rightward inclination of the direction of the imaging lens 26*a* of the smartphone 10 from the reference direction is detected, the CPU 21, as illustrated in FIG. 16, scrolls the image IM rightward from the state illustrated in FIG. 15. Accordingly, the region DA displayed on the smart glasses 50 in the image IM is changed to a right side portion within the image IM. In addition, in a case where the direction of the imaging lens 26*a* of the smartphone 10 is inclined upward from the reference direction, the CPU 21, as illustrated in FIG. 17, scrolls the image IM upward from the state illustrated in FIG. 15. Accordingly, the region DA displayed on the smart glasses 50 in the image IM is changed to an upper side within the image IM.

[Action and Effect]

The CPU 21 (corresponds to the processor) of the smartphone 10 (corresponds to the imaging apparatus and the display control device) in the present embodiment executes the image acquisition processing of acquiring the image to be displayed on the smart glasses 50 (corresponds to the wearable monitor), the first operation instruction acquisition processing of acquiring the first operation instruction that is input through the operation of the operation unit of the smartphone 10 which is a separate body from the smart glasses 50, in order to change the display magnification of the image and that is input through the magnification changing operation in the smartphone 10, and the display control processing of changing the display magnification of the image in accordance with the first operation instruction.

Accordingly, since the user U can change the display magnification of the image displayed on the smart glasses 50 by performing the magnification changing operation in the smartphone 10, the display control device having high usability can be provided.

Generally, the display resolution of the wearable monitor such as the smart glasses 50 is lower than the resolution of the image acquired by the imaging apparatus such as the smartphone 10. Thus, an operation frequency of an operation of displaying the image in an enlarged manner by changing the display magnification of the image in order to check noise and the like of the image in detail in the wearable monitor is high.

According to the disclosed technology, the display magnification changing operation of the image having a high operation frequency can be performed with the same sense of operation as the zoom magnification changing operation performed in a case of imaging as in the present example. Thus, even in a state where wearing the wearable monitor such as the smart glasses 50 blocks a part of the field of view, the user U can easily perform the magnification changing operation. This is because enlarging and reducing of the displayed image are common in both of changing of the zoom magnification in imaging and changing of the display magnification in image display, and the user U is considered to be familiar with the zoom magnification changing operation in the imaging apparatus such as the smartphone 10. Accordingly, the display control device having good operability and high usability for the user can be provided.

In the present example, an example in which the magnification changing operation in the imaging apparatus is the zoom magnification changing operation in imaging of the smartphone 10 which is an example of the imaging apparatus, and in which the display magnification of the image of the wearable monitor is changed by the same operation as the zoom magnification changing operation is described. However, the disclosed technology is not limited thereto. Changing of the zoom magnification is an example, and the magnification changing operation according to the embodiment of the present invention can also be applied to, for example, changing of a magnification of an extender lens of a TV lens. The magnification changing operation in the imaging apparatus may be the display magnification changing operation of changing the display magnification of the image in a case of displaying the image on the smartphone 10 which is an example of the imaging apparatus. That is, the display magnification of the image of the wearable monitor may be changed by the same operation as the display magnification changing operation of the image in the imaging apparatus.

In addition, in the display control processing, the CPU 21 controls the amount of change in the display magnification of the image IM in accordance with the amount of change in the magnification with respect to the operation amount of the magnification changing operation. Such an aspect enables the display magnification of the image displayed on the smart glasses 50 to be changed with the same sense of operation as the magnification changing operation in the smartphone 10 and thus, is preferable.

In addition, the CPU 21 further executes the second operation instruction acquisition processing of acquiring a change in the posture of the smartphone 10 detected by the posture detection unit 27, which detects the posture of the smartphone 10, as the second operation instruction and scrolls the image in accordance with the second operation instruction in the display control processing. Such an aspect enables a scroll operation to be performed with the same sense as inclining the smartphone 10 toward a desired subject in a case of imaging.

In addition, the smartphone 10 comprises the touch panel 24. In a case where the zoom magnification changing operation in a case of imaging of the smartphone 10 is the swipe operation within the zoom magnification input region 24a in the touch panel, the CPU 21 detects, as an operation of changing the display magnification of the image, the swipe operation within the magnification input region 24b that includes the zoom magnification input region 24a and that is wider than the zoom magnification input region 24a in the touch panel 24. Such an aspect enables the swipe operation to be detected even in a case where a position of the finger of the swipe operation is separated from the magnification designation line 35b because the user U performs the display magnification changing operation without seeing the touch panel 24. Thus, the display control device of higher usability is implemented.

In addition, the CPU 21 detects the swipe operation of an arc shape of which a radius R is greater than or equal to 3 cm and less than or equal to 8 cm in the touch panel 24 as the display magnification changing operation. The swipe operation of an arc shape of which the radius R is greater than or equal to 3 cm and less than or equal to 8 cm has a shape in which the swipe operation can be comfortably performed in a case where the user U holds the smartphone 10 in a hand and performs the swipe operation with a thumb. Such an aspect can provide the display control device of higher usability. In a case where the radius R of the swipe operation of an arc shape is below 3 cm, the operation has to be performed by extremely bending the thumb. Thus, it is difficult to perform the swipe operation. In addition, in a case where the radius R of the swipe operation of an arc shape is above 8 cm, a case where the radius R cannot be reached even by fully stretching the thumb occurs. Thus, it is difficult to perform the swipe operation.

In addition, the image IM displayed on the smart glasses 50 is the image captured by the smartphone 10. That is, capturing of the image IM and changing of the display magnification in a case of displaying the image IM can be performed by the same smartphone 10. Thus, the display control device of high usability is implemented.

Second Embodiment

Next, a second embodiment of the present disclosure will be described. In an image display system 2 according to the second embodiment, an apparatus that functions as the display control device is not the smartphone 10 and is changed to the smart glasses 50 unlike in the first embodiment. That is, as will be described later, the smart glasses 50 execute the image acquisition processing, the first operation instruction acquisition processing, and the display control processing. In addition, in the second embodiment, the image to be displayed on the smart glasses 50 is not acquired from the smartphone 10 and is changed to be acquired from an external server 70 unlike in the first embodiment.

Figure 18:
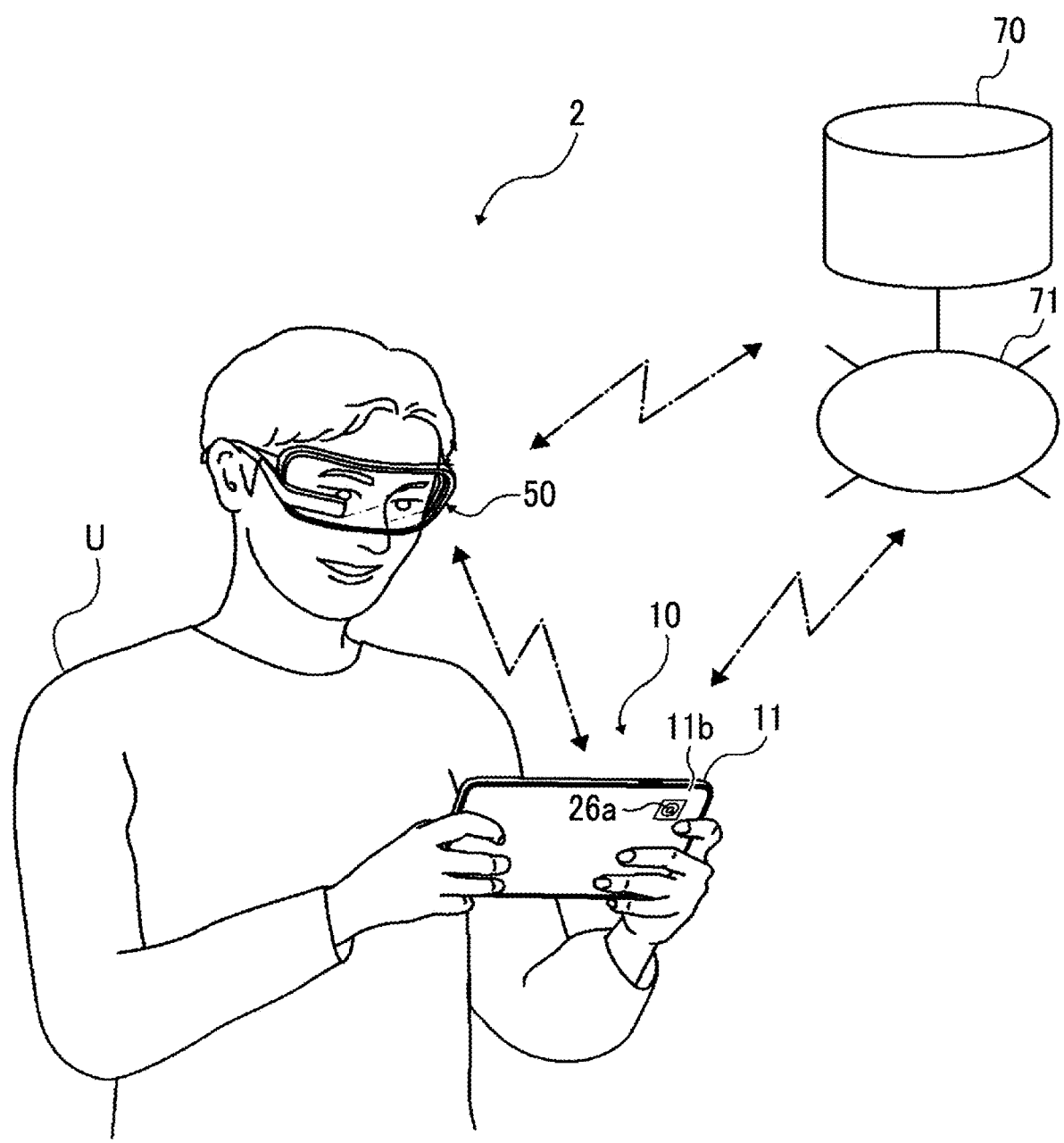
FIG. 18 is a schematic configuration diagram of an image display system including a display control device according to a second embodiment.

Hardware configurations of the smartphone 10 and the smart glasses 50 are the same as in the first embodiment. Thus, duplicate content of the first embodiment will not be described. FIG. 18 is a schematic configuration diagram of an image display system including a display control device according to the second embodiment.

As illustrated in FIG. 18, the image display system 2 comprises the smartphone 10 and the smart glasses 50. The CPU 61 of the smart glasses 50 is an example of the processor according to the embodiment of the disclosed technology. In addition, the memory 62 is an example of the memory according to the embodiment of the disclosed technology. The smart glasses 50 comprising the CPU 61 and the memory 62 also function as the display control device according to the embodiment of the disclosed technology. The CPU 61 of the smart glasses 50 acquires the image to be displayed on the smart glasses 50 from the external server 70.

The smartphone 10 and the smart glasses 50 are wirelessly directly connected. The smartphone 10 and the server 70 are wirelessly connected through a network 71. In the same manner, the smart glasses 50 and the server 70 are wirelessly connected through the network 71.

[Flow of Processing]

Figure 19:
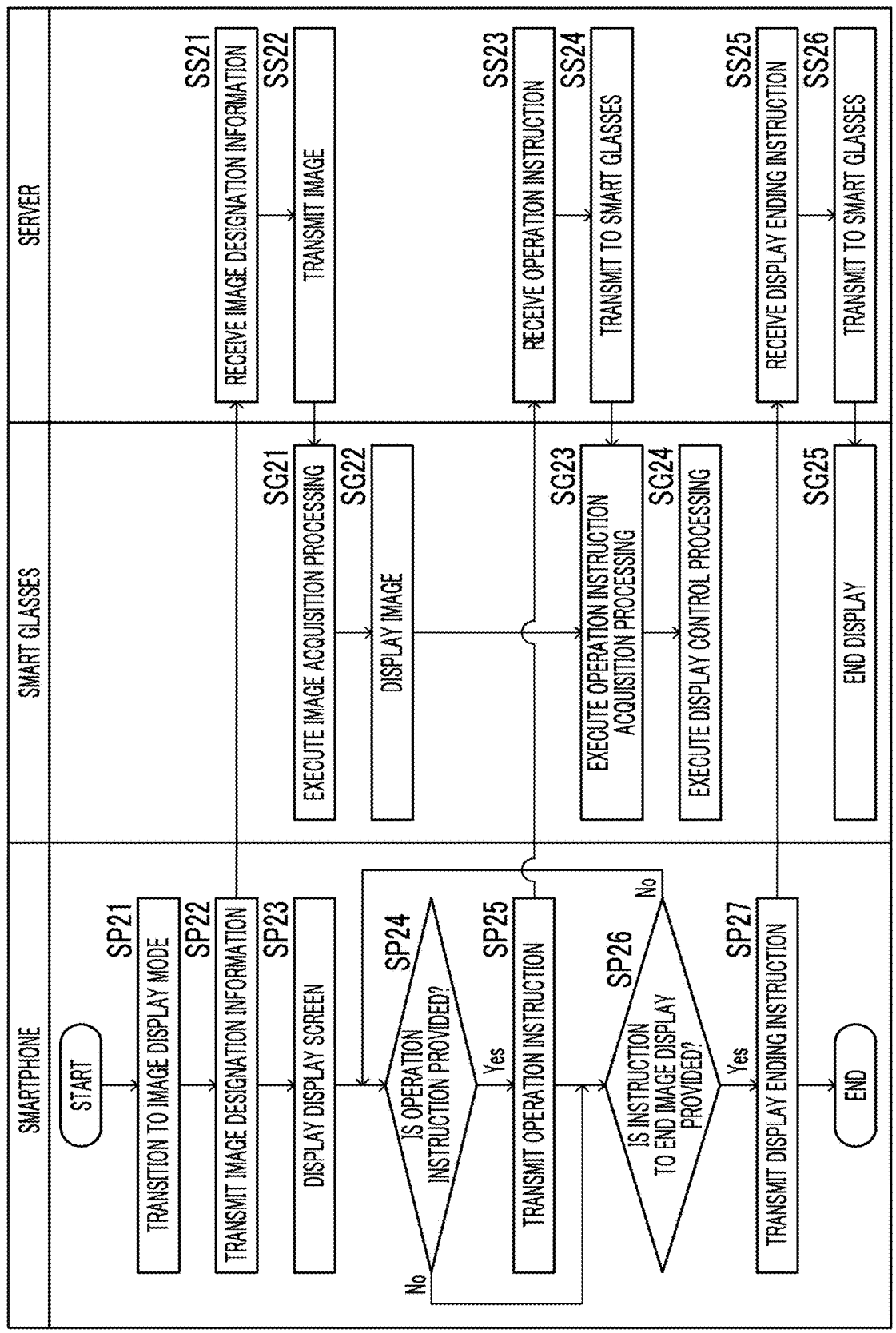
FIG. 19 is a flowchart for describing processing in image display in the second embodiment.

Next, processing performed in the present embodiment will be described. FIG. 19 is a flowchart for describing processing in image display in the image display system 2.

In a case where the instruction to set the image display mode is input from the user U, the CPU 21 of the smartphone 10 transitions to the image display mode (step SP21).

In a case where the image to be displayed is designated by the user U from images stored in the server 70, the CPU 21 transmits image designation information indicating the designated image to the server 70 (step SP22).

In a case where the image designation information is received from the smartphone 10 (step SS21), the server 70 transmits the designated image to the smart glasses 50 (step SS22).

The CPU 61 of the smart glasses 50 executes the image acquisition processing of acquiring the image IM to be displayed on the display unit 64 by receiving the image from the server 70 (step SG21). Next, the CPU 61 adjusts the resolution of the acquired image in accordance with the resolution of the display unit 64 of the smart glasses 50. In the initial state, the image has a size in which the entire image falls within the entire screen of the display unit 64. The CPU 61 adjusts a size of the image IM to the image size of the initial state and displays the image IM on the display unit 64 (step SG22).

Next, in step SP23, the CPU 21 of the smartphone 10 displays the display screen IV illustrated in FIG. 12 on the touch panel 24 for a state where the instructions to change the display magnification and to scroll the image displayed on the smart glasses 50 are received from the user U.

In a case where the first operation instruction for changing the display magnification of the image or the second operation instruction for scrolling the image IM is input (a Yes determination in step SP24), the CPU 21 transmits the operation instruction to the server 70 (step SP25).

In a case where any of the first operation instruction and the second operation instruction is received from the smartphone 10 (step SS23), the server 70 transmits the operation instruction to the smart glasses 50 (step SS24).

The CPU 61 of the smart glasses 50 executes the operation instruction acquisition processing of acquiring the operation instruction as an instruction to change the display aspect by receiving the operation instruction from the server 70 (step SG23). Next, the CPU 61 executes the display control processing of changing the display magnification or of scrolling the image IM in accordance with the operation instruction and displays the image IM of which the display aspect is changed by changing of the display magnification or by scrolling on the display unit 64 (step SG24).

In the smartphone 10, the processing of changing the display magnification and of scrolling the image is repeated until the instruction to end the image display is input from the user U (steps SP24 to SP26). The smart glasses 50 and the server 70 also repeat the processing illustrated in FIG. 19 in accordance with the processing of the smartphone 10.

After checking of the image ends, the user U inputs the instruction to end the image display into the smartphone 10. For example, the input of the instruction to end the image display is provided by the physical button, not illustrated, provided in the smartphone 10 or by the return button, not illustrated, in the touch panel 24. In a case where the instruction to end the image display is input (a Yes determination in step SP26), the CPU 21 of the smartphone 10 transmits a display ending instruction to the server 70 (step SP27) and ends the processing.

In a case where the display ending instruction is received from the smartphone 10 (step SS25), the server 70 transmits the display ending instruction to the smart glasses 50 (step SS26).

In a case where the display ending instruction is received from the server 70, the CPU 61 of the smart glasses 50 ends the display of the image on the display unit 64 (step SG25).

[Action and Effect]

In the present embodiment, the smart glasses 50 which are an example of the wearable monitor according to the embodiment of the disclosed technology also functions as the display control device according to the embodiment of the disclosed technology. In addition, the CPU 61 of the smart glasses 50 acquires the image IM from the external server 70 in the image acquisition processing and acquires the first operation instruction and the second operation instruction through the server 70 in the operation instruction acquisition processing.

Such an aspect enables images other than the image captured by the smartphone 10 to be acquired from the server 70 and displayed on the smart glasses 50.

In addition, in a case of displaying the image IM on the smart glasses 50, all pieces of data acquired by the smart glasses 50 are acquired from the server 70. Thus, in a case of displaying the image, the smart glasses 50 do not need to communicate with the smartphone 10 and may communicate with only the server 70. Accordingly, a load of communication processing with respect to the smartphone 10 can be reduced.

Third Embodiment

Next, a third embodiment of the present disclosure will be described. An image display system according to the third embodiment is different from the second embodiment in that the CPU 61 of the smart glasses 50 directly acquires the first operation instruction and the second operation instruction in the display control processing and the display ending instruction in a case of ending the image display, from the smartphone 10 without passing through the server 70 (refer to steps SP35 and SP37 and steps SG33 and SG35). Hardware configurations of the smartphone 10 and the smart glasses 50 are the same as in the second embodiment and thus, will not be described.

[Flow of Processing]

Figure 20:
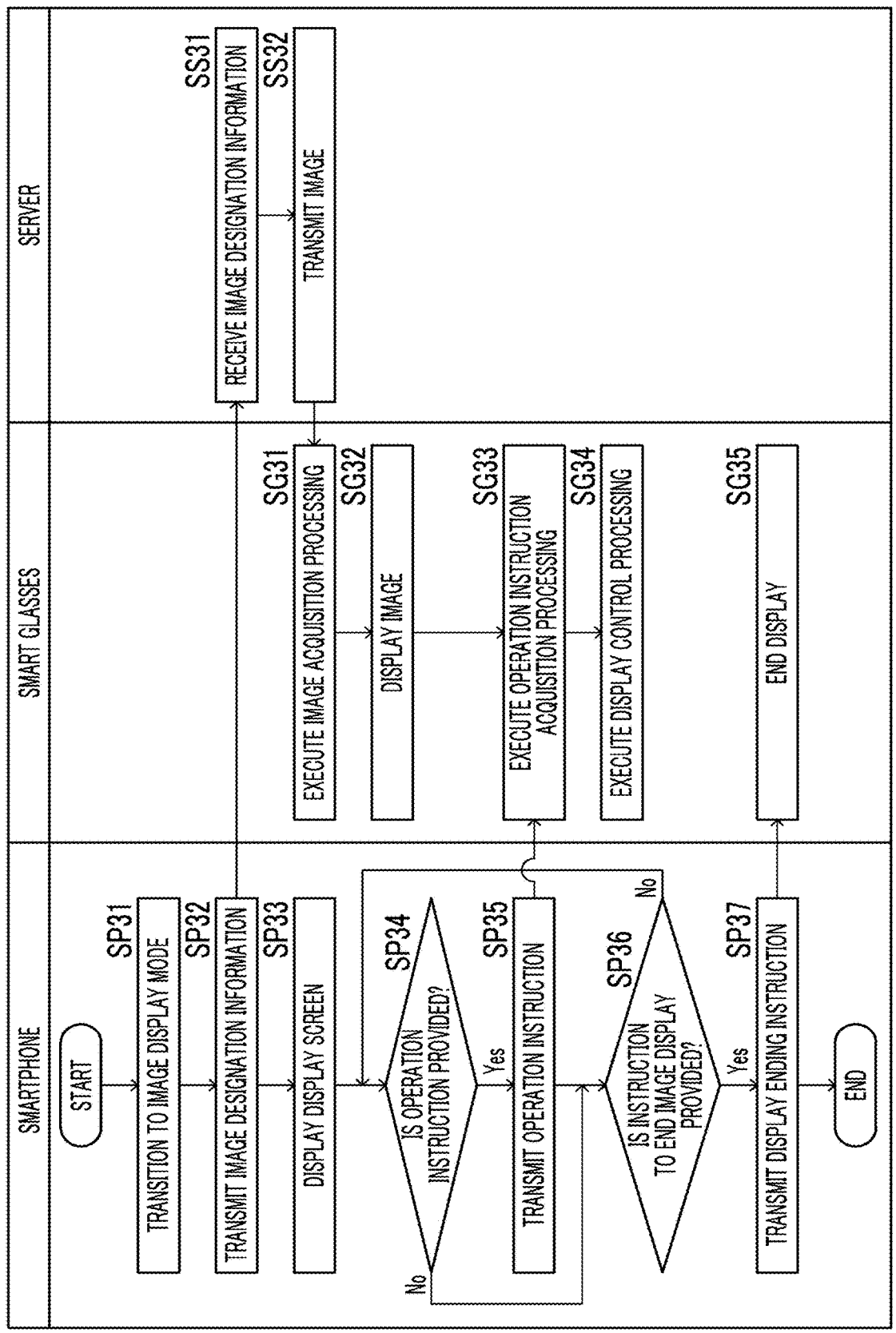
FIG. 20 is a flowchart for describing processing in image display in a third embodiment.

Next, processing performed in the present embodiment will be described. FIG. 20 is a flowchart for describing processing in image display in the image display system of the present embodiment.

In a case where the instruction to set the image display mode is input from the user U, the CPU 21 of the smartphone 10 transitions to the image display mode (step SP31).

In a case where the image to be displayed is designated by the user U from the images stored in the server 70, the CPU 21 transmits the image designation information indicating the designated image to the server 70 (step SP32).

In a case where the image designation information is received from the smartphone 10 (step SS31), the server 70 transmits the designated image to the smart glasses 50 (step SS32). In a case where the image is received from the server 70, the CPU 61 of the smart glasses 50 executes the image acquisition processing of acquiring the image as the image to be displayed on the display unit 64 (step SG31). Next, the CPU 61 adjusts the resolution of the acquired image in accordance with the resolution of the display unit 64 of the smart glasses 50. In the initial state, the image has a size in which the entire image falls within the entire screen of the display unit 64. The CPU 61 adjusts the image to the image size of the initial state and displays the image on the display unit 64 (step SG32).

Next, in step SP33, the CPU 21 of the smartphone 10 displays the display screen IV illustrated in FIG. 12 on the touch panel 24 for a state where the instructions to change the display magnification and to scroll the image displayed on the smart glasses 50 are received from the user U (step SP33).

In a case where the first operation instruction for changing the display magnification of the image or the second operation instruction for scrolling the image IM is input (a Yes determination in step SP34), the CPU 21 transmits the operation instruction to the smart glasses 50 (step SP35).

The CPU 61 of the smart glasses 50 executes the operation instruction acquisition processing of acquiring the operation instruction as an instruction to change the display aspect by directly receiving the operation instruction from the smartphone 10 (step SG33). Next, the CPU 61 executes the display control processing of changing the display magnification or of scrolling the image IM in accordance with the operation instruction and displays the image of which the display aspect is changed by changing of the display magnification or by scrolling on the display unit 64 (step SP34).

In the smartphone 10, the processing of changing the display magnification and of scrolling the image is repeated until the instruction to end the image display is input from the user U (steps SP34 to SP36). The smart glasses 50 and the server 70 also repeat the processing illustrated in FIG. 20 in accordance with the processing of the smartphone 10.

After checking of the image ends, the user U inputs the instruction to end the image display into the smartphone 10. For example, the input of the instruction to end the image display is provided by the physical button, not illustrated, provided in the smartphone 10 or by the return button, not illustrated, in the touch panel 24. In a case where the instruction to end the image display is input (a Yes determination in step SP36), the CPU 21 of the smartphone 10 transmits the display ending instruction to the smart glasses 50 (step SP37) and ends the processing.

In a case where the display ending instruction is directly received from the smartphone 10, the CPU 61 of the smart glasses 50 ends the display of the image on the display unit 64 (step SG35).

[Action and Effect]

In the present embodiment, the smart glasses 50 which are an example of the wearable monitor according to the embodiment of the disclosed technology also functions as the display control device according to the embodiment of the disclosed technology. In addition, the CPU 61 of the smart glasses 50 acquires the image from the external server 70 in the image acquisition processing and directly acquires the first operation instruction and the second operation instruction from the smartphone 10 in the operation instruction acquisition processing.

Such an aspect enables images other than the image captured by the smartphone 10 to be acquired from the server 70 and displayed on the smart glasses 50.

In addition, the smart glasses 50 directly acquire the first operation instruction and the second operation instruction for performing the display control processing such as changing of the display magnification and scrolling of the image from the smartphone 10 without passing through the server 70. Thus, a time lag (a time lag caused by communication delay) from the input of the operation instruction into the smartphone 10 by the user U to the changing of the display aspect can be reduced, compared to a case where the first operation instruction and the second operation instruction are acquired through the server 70.

Fourth Embodiment

Next, a fourth embodiment of the present disclosure will be described. An image display system according to the fourth embodiment is different from the first embodiment in that the initial position C0 of the center position in a case of changing the display magnification of the image is changed in the display control processing in the CPU 21 of the smartphone 10. In the present embodiment, hardware configurations of the smartphone 10 and the smart glasses 50 are the same as in the first embodiment and thus, will not be described.

Figure 21:
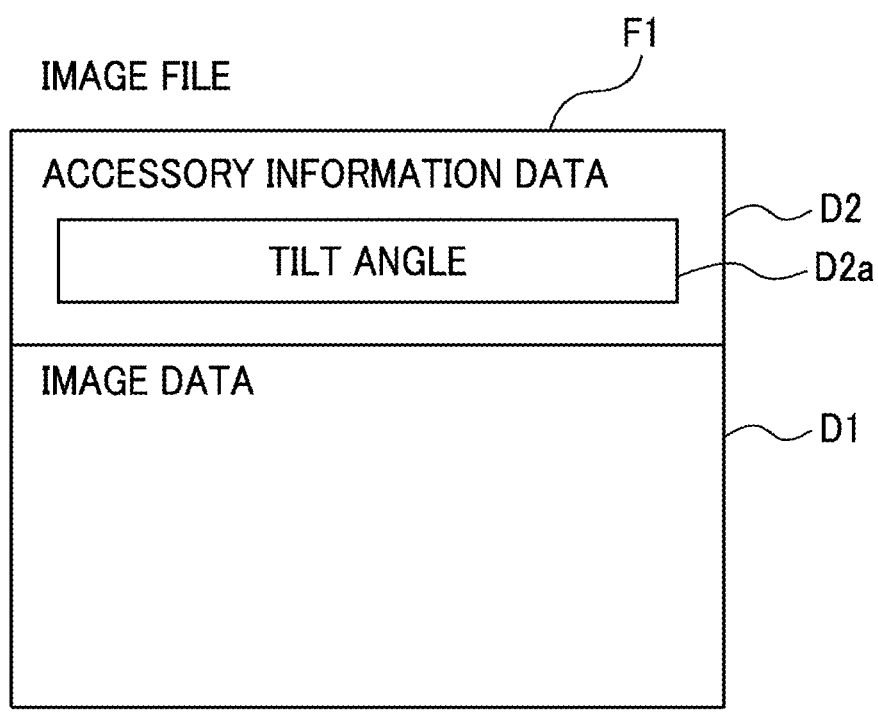
FIG. 21 is a diagram for describing a structure of an image file in a fourth embodiment.

As illustrated in FIG. 21, an image file F1 of the image IM handled in the present embodiment has accessory information data D2 in addition to image data D1. The accessory information data D2 includes, in addition to information such as a capturing date and time of the image and a capturing location of the image, information D2$a$ about a tilt angle that is an inclination angle of the smartphone 10 with respect to the horizontal direction in capturing the image.

Figure 22:
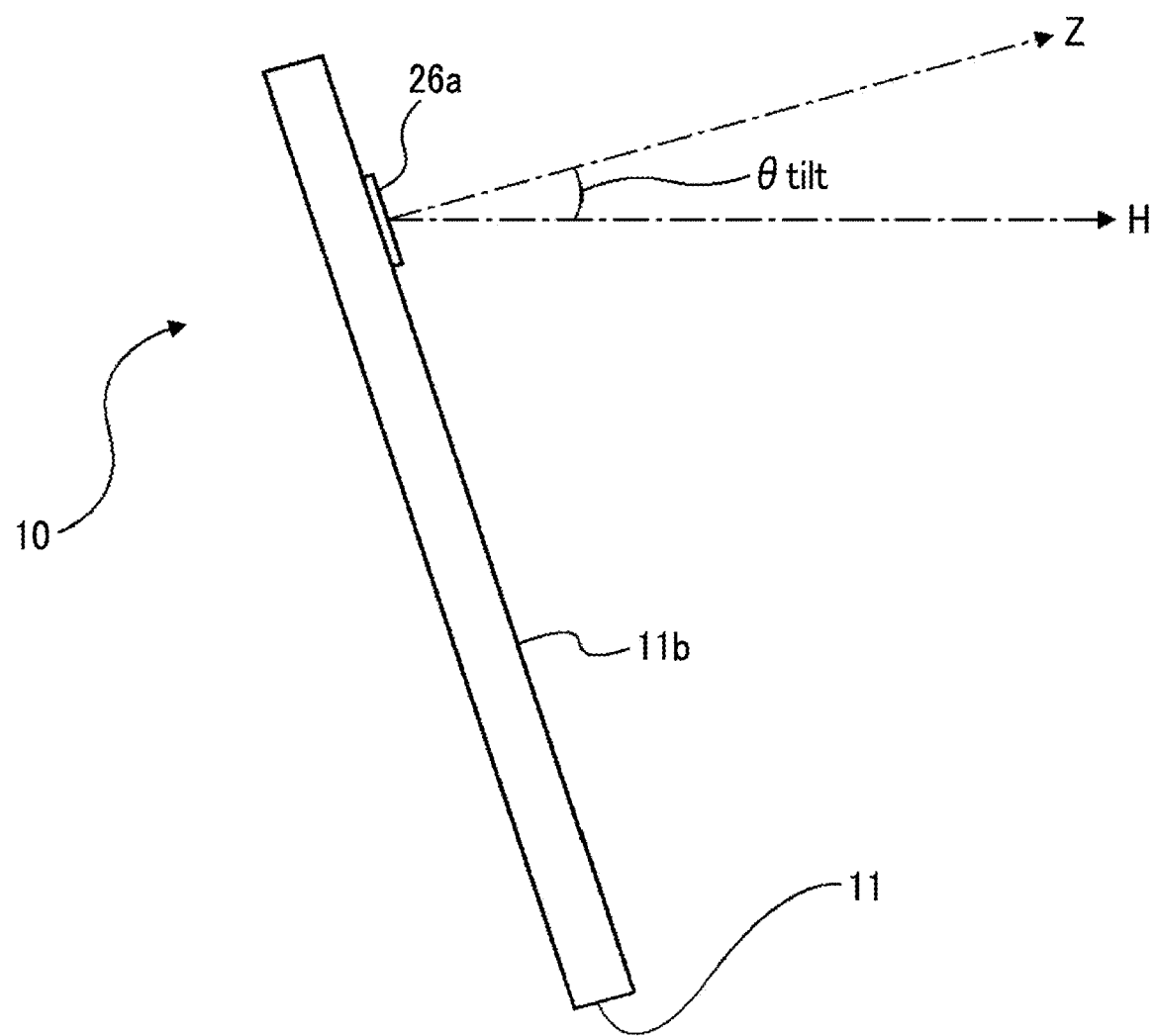
FIG. 22 is a diagram for describing a tilt angle according to an embodiment of the disclosed technology.

As illustrated in FIG. 22, in the embodiment of the disclosed technology, a tilt angle θtilt is specifically an angle between the optical axis direction Z (synonymous with the imaging direction) of the imaging lens 26$a$ of the smartphone 10 and a horizontal direction H. The tilt angle θtilt is 0° in a case where the optical axis direction Z is directed in the horizontal direction H, a positive angle in a case where the optical axis direction Z is directed upward from the horizontal direction H, and a negative angle in a case where the optical axis direction Z is directed downward from the horizontal direction H.

Figure 23:
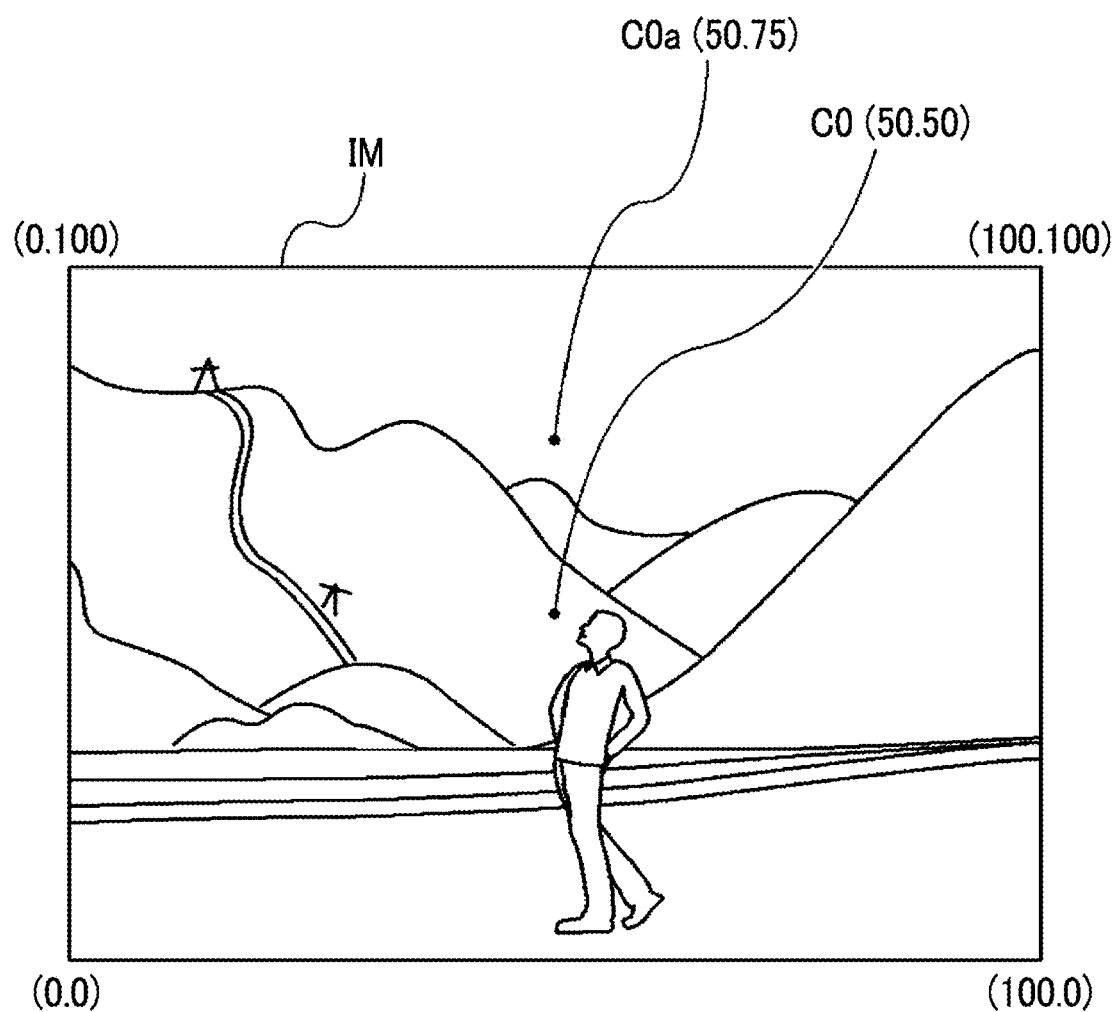
FIG. 23 is a diagram for describing an initial position of a center position in a case of changing a display magnification.

FIG. 23 is a diagram for describing the initial position C0 of the center position in a case of changing the display magnification in the image IM. In FIG. 23, a coordinate of the image IM in an X direction (that is, the lateral direction in FIG. 23) is denoted by X, and a coordinate of the image IM in a Y direction (that is, the vertical direction in FIG. 23) is denoted by Y. Regarding the two-dimensional coordinates (X, Y) of the image IM, lower left coordinates are set as an origin (0, 0), and upper right coordinates are set as an apex (100, 100). In addition, both of the X coordinate and the Y coordinate show values obtained by normalizing the maximum value of the number of pixels of the image IM to 100.

In the first embodiment, coordinates of the initial position C0 of the center position in a case of changing the display magnification of the image are (50, 50) which is a coordinate position of the center position of the image IM. Meanwhile, in the present embodiment, the CPU 21 of the smartphone 10 changes the coordinate position of the initial position C0 of the center position in a case of changing the display magnification of the image from the default coordinate position (50, 50) based on the information D2a about the tilt angle included in the image file F1.

Figure 24:
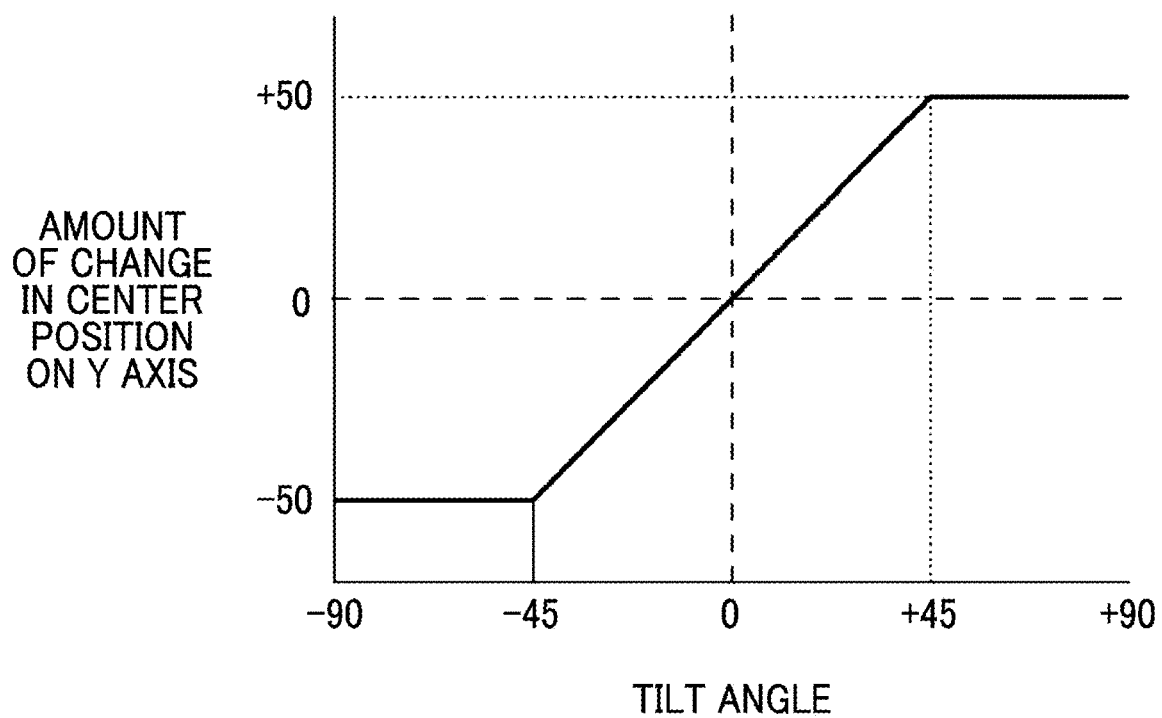
FIG. 24 is a graph showing a relationship between the tilt angle and an amount of change in the center position on a Y axis.

Regarding changing of the initial position C0 of the center position in a case of changing the display magnification of the image, the coordinate position (50, 50) of the initial position C0 of the center position is not changed from the default position in a case where the tilt angle θtilt is 0 as illustrated in FIG. 24 as an example. In addition, in a case where the tilt angle θtilt is positive, an amount of change in the center position on a Y axis is linearly changed from 0 to 50 with respect to the tilt angle θtilt greater than 0° and less than or equal to 45°. In a case where the tilt angle θtilt is above 45°, the amount of change in the center position on the Y axis is 50.

In addition, in a case where the tilt angle θtilt is negative, the amount of change in the center position on the Y axis is linearly changed from 0 to −50 with respect to the tilt angle θtilt greater than or equal to −45° and less than 0°. In a case where the tilt angle θtilt is below −45°, the amount of change in the center position on the Y axis is −50. That is, in a case where the tilt angle is positive, the initial position C0 of the center position in a case of changing the display magnification of the image IM is in an upper part within the image IM. In a case where the tilt angle is negative, the initial position C0 of the center position in a case of changing the display magnification of the image IM is in a lower part within the image IM. As an example, in a case where the tilt angle θtilt is 22.5°, the coordinates of the initial position of a center position C0a after change are changed to (50, 75) as illustrated in FIG. 23.

In the present embodiment, the image file F1 of the image IM includes, in addition to the image data D1, the information D2a about the tilt angle which is the inclination angle of the smartphone 10 with respect to the horizontal direction in capturing the image IM, as the accessory information data D2. In this case, the CPU 21 of the smartphone 10 changes the initial position C0 of the center position in a case of changing the display magnification of the image IM, in the display control processing based on the information D2a about the tilt angle.

For example, in a case of capturing a landscape photo at a distance, in a case where the direction of the imaging lens 26a of the smartphone 10 is directed upward, a region closer to the sky is captured. In this state, in a case where the zoom magnification changing operation is performed, the zoom magnification is changed with respect to the sky as a center.

In the aspect of the present embodiment, even with the image IM that has already been captured, the initial position C0 of the center position in a case of changing the display magnification of the image IM is changed to an upper part of the image IM in a case where the tilt angle in imaging is positive, that is, in a case where the image IM is captured in a state where the optical axis direction Z of the imaging apparatus is directed upward. Thus, in a case of image display, the user U can feel the sense of zoom changing in a case of imaging in a pseudo manner.

Fifth Embodiment

Next, a fifth embodiment of the present disclosure will be described. An image display system according to the fifth embodiment is different from the first embodiment in that the image IM is corrected to be in the horizontal direction in a case of displaying the image IM on the smart glasses 50.

In the present embodiment, hardware configurations of the smartphone 10 and the smart glasses 50 are the same as in the first embodiment and thus, will not be described.

Figure 25:
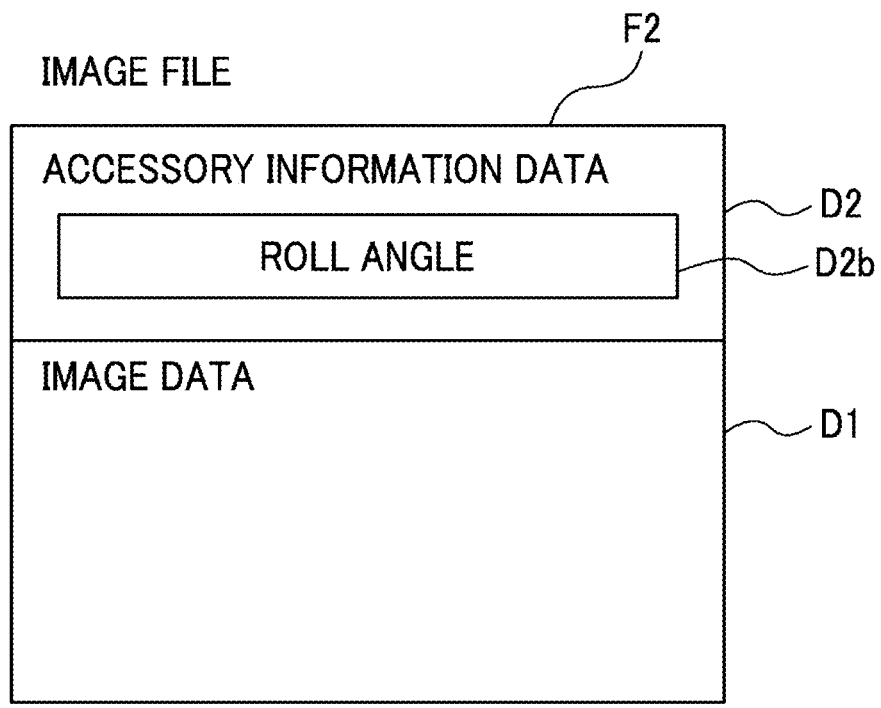
FIG. 25 is a diagram for describing a structure of an image file in a fifth embodiment.

As illustrated in FIG. 25, an image file F2 of the image IM handled in the present embodiment has the accessory information data D2 in addition to the image data D1. The accessory information data D2 includes, in addition to the information such as the capturing date and time of the image and the capturing location of the image, information D2b about a roll angle that is a rotation angle of the smartphone 10 about the optical axis direction Z (synonymous with the imaging direction) with respect to the horizontal direction in capturing the image.

Figure 26:
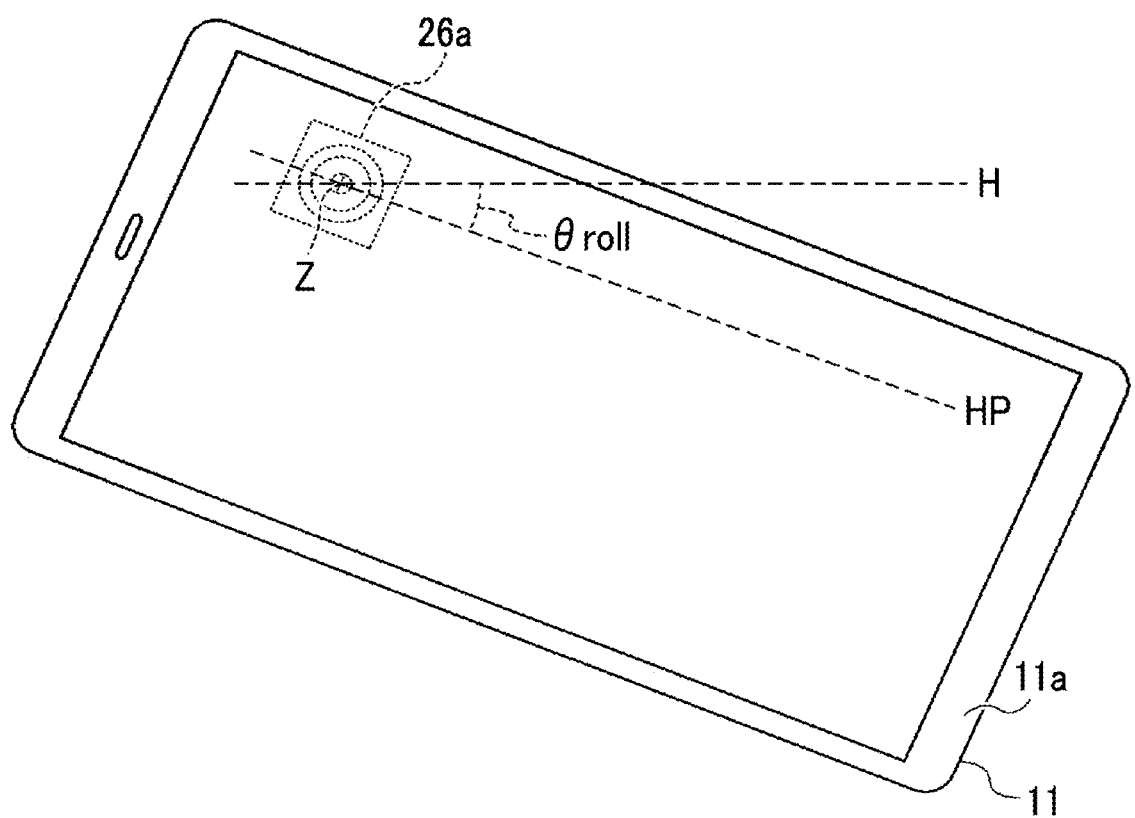
FIG. 26 is a diagram for describing a roll angle according to the embodiment of the disclosed technology.

As illustrated in FIG. 26, in the embodiment of the disclosed technology, a roll angle θroll is specifically an angle between a lateral direction HP of the smartphone 10 in imaging and the horizontal direction H. In imaging of the smartphone 10, changing an angle of the housing 11 of the smartphone 10 with respect to the horizontal direction H can switch between capturing of a vertically long image and capturing of a laterally long image. In either case, a direction of the smartphone 10 corresponding to the lateral direction (longitudinal direction) of the image IM is the lateral direction HP.

In a case where the imaging direction of the smartphone 10 is set to a rear side of the page of FIG. 26, the roll angle θroll is a positive angle in a case where a right end of the smartphone 10 is above the horizontal direction H with respect to the optical axis direction Z as a center in FIG. 26, that is, in a state where the smartphone 10 is rotated counterclockwise. In addition, the roll angle θroll is a negative angle in a case where the right end of the smartphone 10 is below the horizontal direction H with respect to the optical axis direction Z as a center in FIG. 26 (FIG. 26 illustrates this state), that is, in a case where the smartphone 10 is rotated clockwise.

FIG. 26 illustrates a state where a laterally long image is captured by the smartphone 10. In this state, a longitudinal direction of the housing 11 of the smartphone 10 is the lateral direction HP of the smartphone 10. In addition, in FIG. 26, a state where the roll angle θroll of the smartphone 10 in capturing the image is negative is illustrated. In a case where the image is captured in this state, a horizontal direction HI of the subject in the image IM is in a state of being rotated counterclockwise about a center CI of the image IM as an axis as illustrated in FIG. 27.

In a case of displaying the image on the smart glasses 50, the CPU 21 of the smartphone 10 corrects the image IM with respect to the horizontal direction. As the correction in the horizontal direction, for example, the entire image IM may be rotated by the same angle as the roll angle θroll about the center CI of the image IM as an axis. At this point, a direction in which the image IM is rotated counterclockwise corresponds to a positive angle. In addition, a direction in which the image IM is rotated clockwise corresponds to a negative angle.

Figure 27:
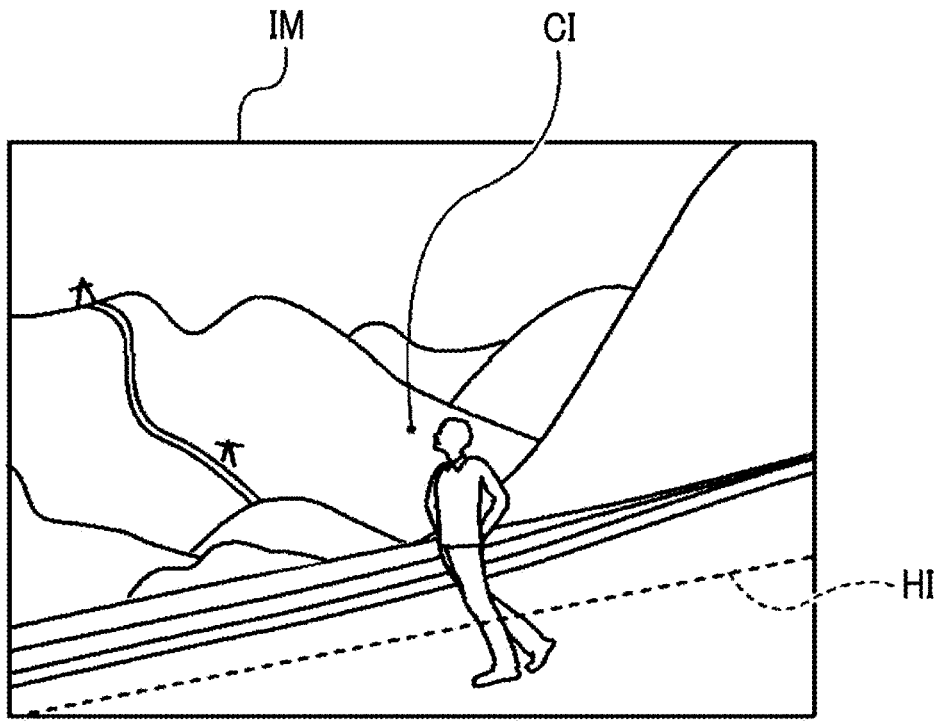
FIG. 27 is a diagram illustrating an image captured in a state where the smartphone is inclined.
Figure 28:
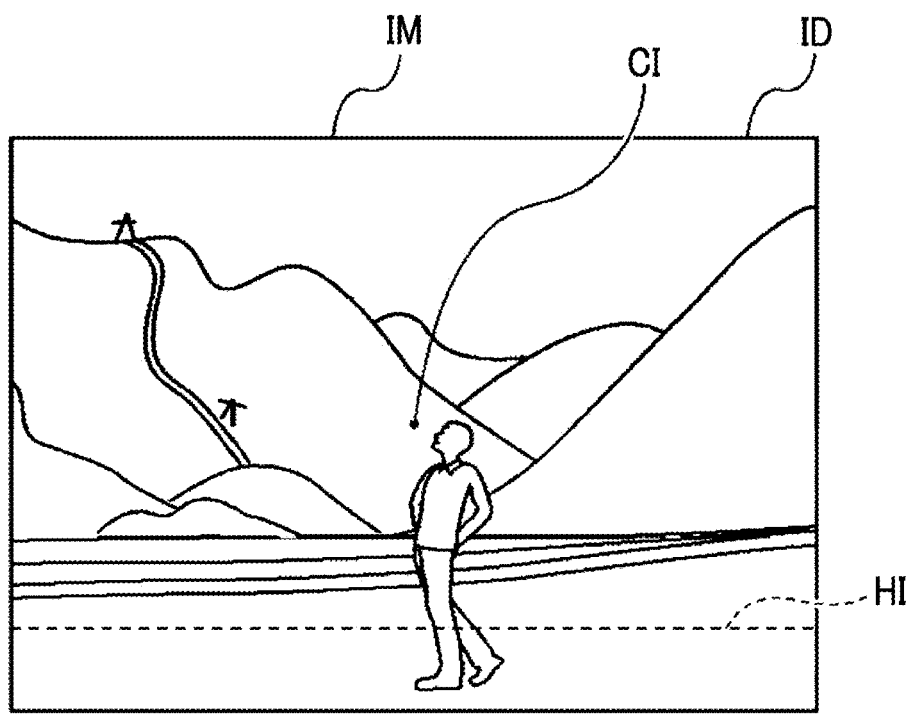
FIG. 28 is a diagram illustrating a state where the image captured in a state where the smartphone is inclined is corrected.

As illustrated in FIG. 27 as an example, in a case of the image IM captured in a state where the roll angle θroll is −20°, the horizontal direction HI of the subject in the image IM is in a state of being rotated counterclockwise by 20° about the center CI of the image IM as an axis. Thus, as illustrated in FIG. 28, by rotating the entire image IM by −20°, which is the same angle as the roll angle θroll, about the center CI of the image IM as an axis, the horizontal direction HI of the subject in the image IM can be matched to the left-right direction of the image IM.

Such an aspect enables the horizontal direction of the subject to match the left-right direction of the image IM even in a case where the image is captured in an inclined state. Thus, an image that does not make the user U feel unnatural can be displayed on the smart glasses 50.

Sixth Embodiment

Next, a sixth embodiment of the present disclosure will be described. An image display system according to the sixth embodiment is a configuration for matching the amount of change in the magnification with respect to the operation amount of the magnification changing operation in a case of imaging to the amount of change in the magnification with respect to the operation amount in a case of changing the display magnification of the image, particularly in a case where an imaging apparatus that has performed imaging is different from an imaging apparatus for inputting the operation instruction such as the magnification changing operation and scrolling of the image.

In the present embodiment, content of the display control processing in the CPU 21 of the smartphone 10 is different from the first embodiment. In the present embodiment, hardware configurations of the smartphone 10 and the smart glasses 50 are the same as in the first embodiment and thus, will not be described.

Figure 29:
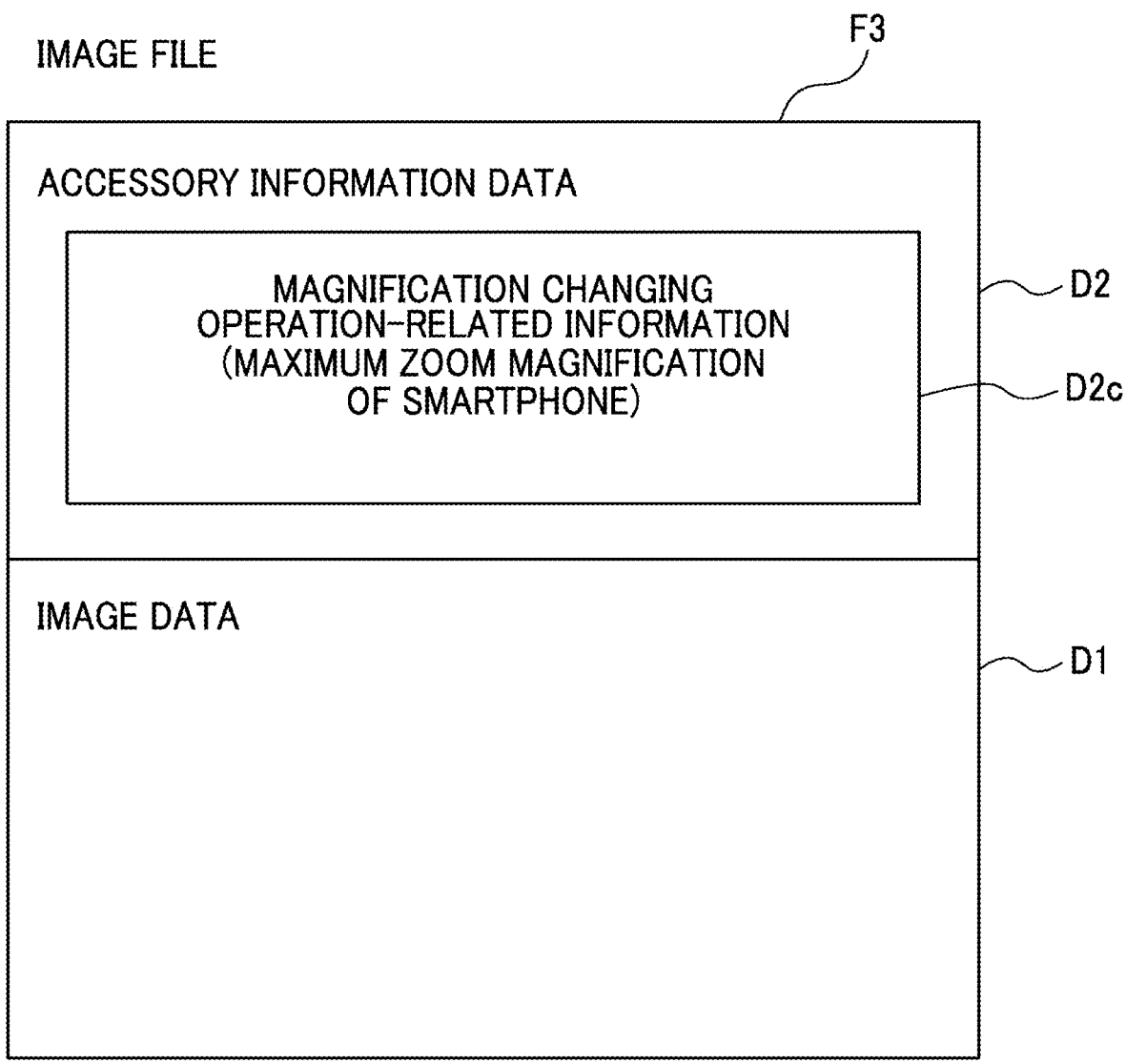
FIG. 29 is a diagram for describing a structure of an image file in a sixth embodiment.

As illustrated in FIG. 29, an image file F3 of the image handled in the present embodiment has the accessory information data D2 in addition to the image data D1. The accessory information data D2 includes, in addition to the information such as the capturing date and time of the image and the capturing location of the image, magnification changing operation-related information D2c related to the amount of change in the magnification with respect to the operation amount of the magnification changing operation in a case of imaging in the imaging apparatus that has captured the image. In the present embodiment, a case where information about the maximum zoom magnification of a smartphone that has captured the image is recorded for the magnification changing operation-related information D2c will be described as an example.

Images stored in the storage 23 of the smartphone 10 of the image display system are not necessarily limited to images captured by the smartphone 10. In a case where the maximum zoom magnification of the smartphone that has captured the image is different from the maximum zoom magnification of the smartphone 10, the sense of operation in the zoom magnification changing operation is different between the smartphone that has captured the image, and the smartphone 10.

In such a case, the CPU 21 of the smartphone 10 acquires, as the magnification changing operation-related information D2c, the information about the maximum zoom magnification of the smartphone that has captured the image, from the accessory information data D2 of the image file F3 of the image to be displayed.

Figure 30:
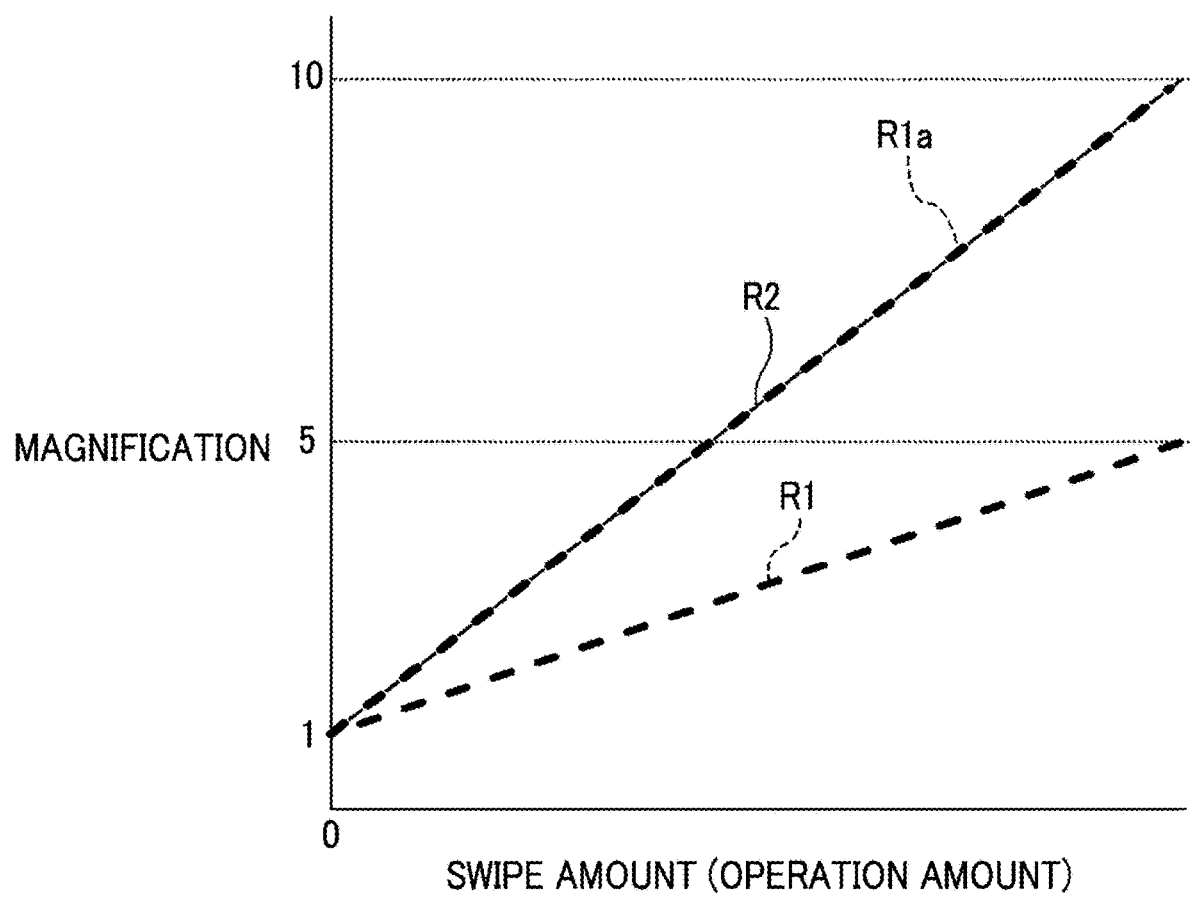
FIG. 30 is a graph showing a relationship between the swipe amount and the magnification in the touch panel.

FIG. 30 is a graph showing a relationship between the swipe amount (that is, the operation amount) and the magnification in the zoom magnification changing operation. Here, a case where the maximum zoom magnification of the smartphone 10 is a magnification of 5, and where the maximum zoom magnification of the smartphone that has captured the image is a magnification of 10 will be described as an example.

A state where a lower limit value of the magnification designation line 30b of the zoom magnification input unit 30 in the smartphone 10 is superimposed on the magnification display unit 30a is set as a reference position (that is, a swipe amount of 0), and a relationship between the swipe amount from the reference position and the amount of change in the magnification is shown in the graph R1. In addition, a state where a lower limit value of a magnification designation line of a zoom magnification input unit in the smartphone that has captured the image is superimposed on a magnification display unit is set as a reference position (that is, a swipe amount of 0), and a relationship between the swipe amount from the reference position and the amount of change in the magnification is shown in a graph R2.

As described above, the maximum zoom magnification of the smartphone that has captured the image is a magnification of 10, and the maximum zoom magnification of the smartphone 10 is a magnification of 5. Thus, even in a case where operations of the same operation amount are performed in the zoom magnification changing operation, the amounts of change in the zoom magnification do not match.

Thus, the CPU 21 of the smartphone 10 performs processing of matching the amount of change in the zoom magnification with respect to the operation amount of the zoom magnification changing operation in the smartphone that has captured the image, to the amount of change in the zoom magnification with respect to the operation amount of the zoom magnification changing operation in the smartphone 10, based on the information about the maximum zoom magnification of the smartphone that has captured the image. Specifically, as shown in a graph R1a in FIG. 30, the display magnification at one end of the magnification designation line 30b is set to a magnification of 1. The display magnification at the other end of the magnification designation line 30b is set to a magnification of 10 which is the same as the maximum zoom magnification of the smartphone that has captured the image. The display magnification in the intermediate portion is set to a magnification of 1 to a magnification of 10 in accordance with the distance from the one end.

Figure 31:
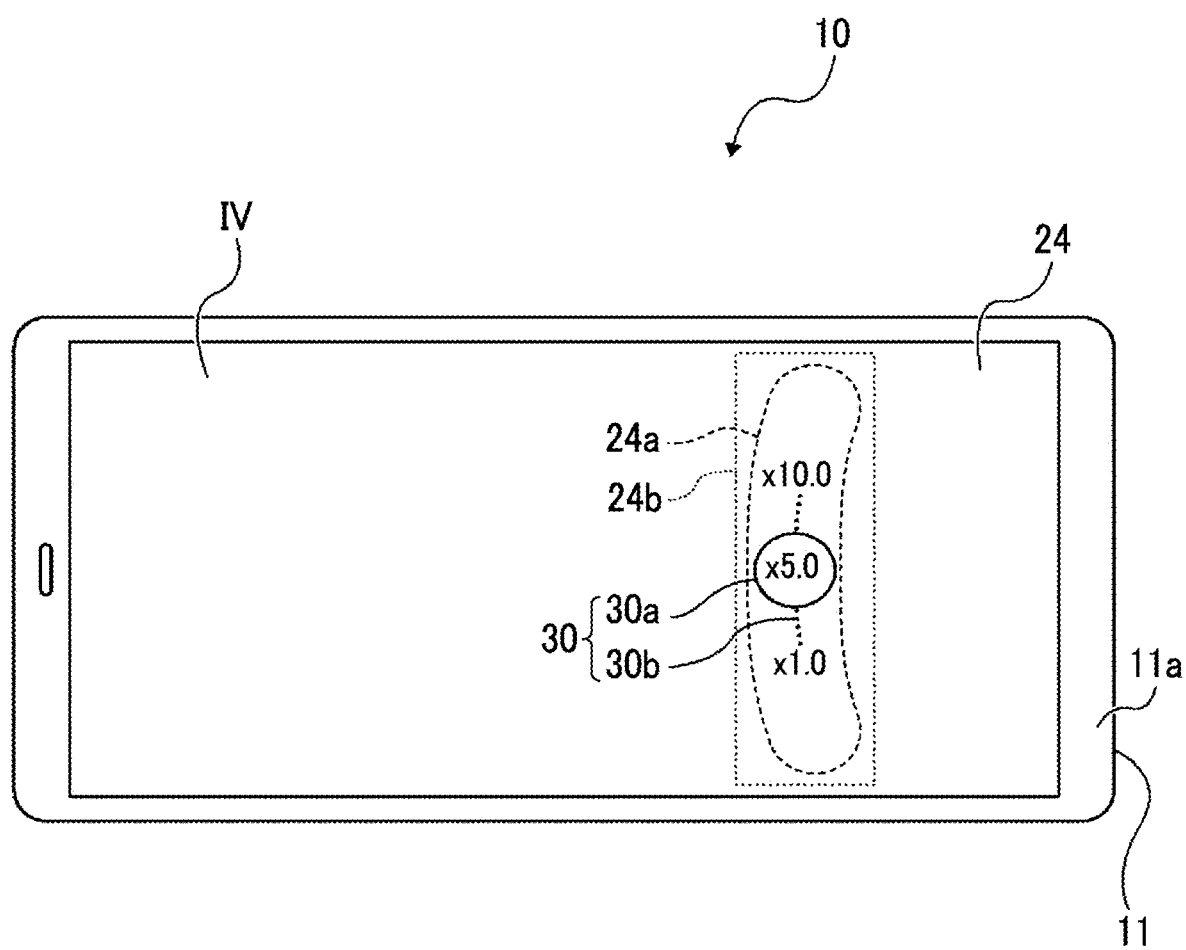
FIG. 31 is a diagram illustrating an example of the display screen displayed on the touch panel.

In addition, as illustrated in FIG. 31, even in the zoom magnification input unit 30, the display magnification at one end of the magnification designation line 30b is set to a magnification of 1. The display magnification at the other end of the magnification designation line 30b is set to a magnification of 10. The display magnification in the intermediate portion is set to a magnification of 1 to a magnification of 10 in accordance with the distance from the one end.

Such an aspect enables the sense of operation in the zoom magnification changing operation to be the same between the smartphone that has captured the image, and the smartphone 10 in a case where the maximum zoom magnification of the smartphone that has captured the image is different from the maximum zoom magnification of the smartphone 10.

In a case where a size of a touch panel of the smartphone that has captured the image is different from a size of the touch panel 24 of the smartphone 10, the sense of operation in the zoom magnification changing operation is not exactly the same between the smartphone that has captured the image, and the smartphone 10.

In addition, in a case where a GUI in the zoom magnification changing operation of the smartphone that has captured the image is different from a GUI in the zoom magnification changing operation of the smartphone 10, the sense of operation in the zoom magnification changing operation is not exactly the same between the smartphone that has captured the image, and the smartphone 10.

However, even in these cases, the aspect of the present embodiment can make the sense of operation in the zoom magnification changing operation in the smartphone 10 approach the sense of operation of the smartphone that has captured the image.

Seventh Embodiment

Next, a seventh embodiment of the present disclosure will be described. An image display system according to the seventh embodiment is a configuration for matching the amount of change in the magnification with respect to the operation amount of the magnification changing operation in a case of imaging to the amount of change in the magnification with respect to the operation amount in a case of changing the display magnification of the image, particularly in a case where an imaging apparatus that has performed imaging is different from an imaging apparatus for inputting the operation instruction such as the magnification changing operation and scrolling of the image.

In the present embodiment, an interface of the zoom magnification changing operation in the smartphone 10 is different from the sixth embodiment. In addition, content of the display control processing in the CPU 21 of the smartphone 10 is different. In the present embodiment, hardware configurations of a body of the smartphone 10 and the smart glasses 50 are the same as in the first embodiment and thus, will not be described.

Figure 32:
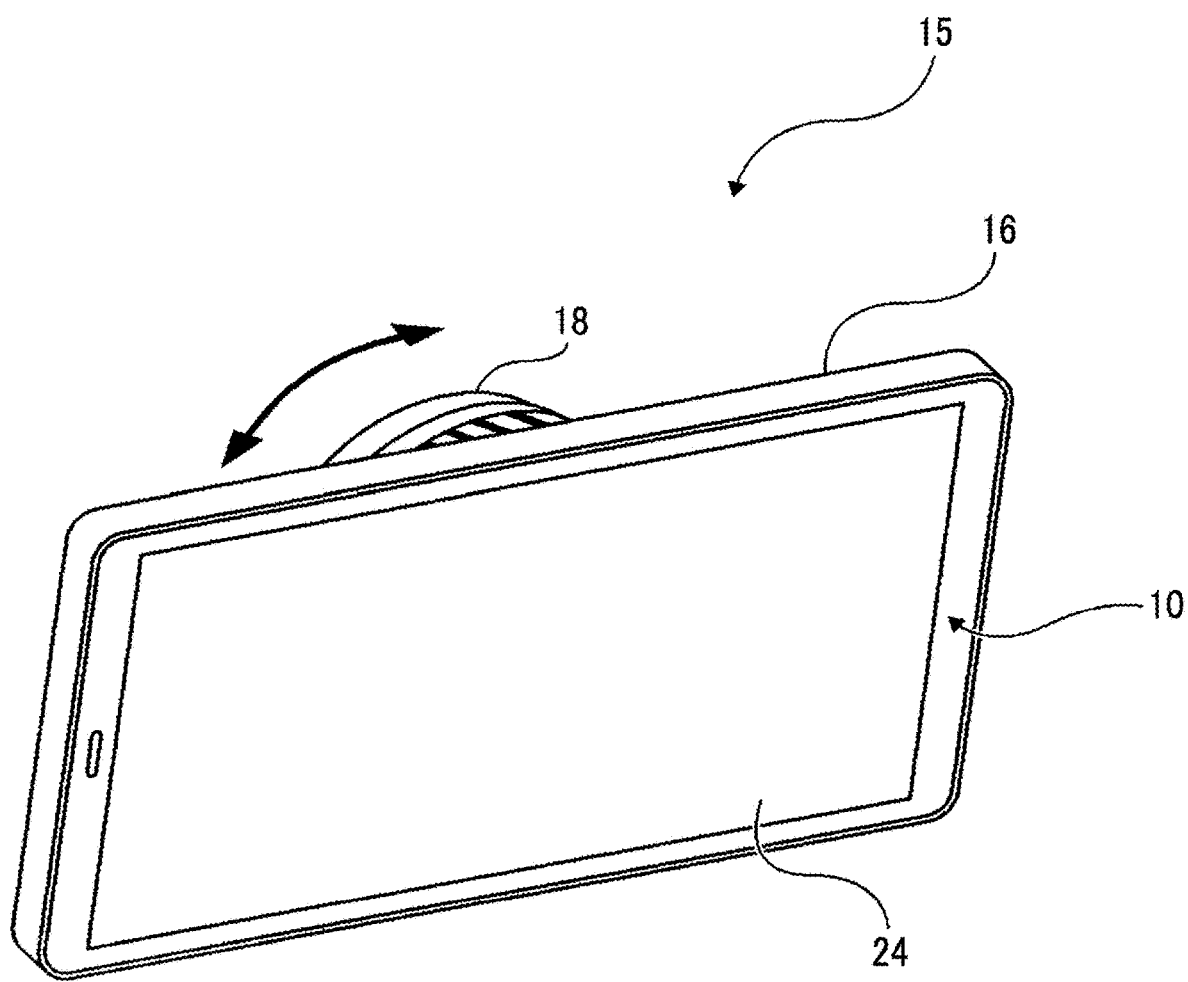
FIG. 32 is an external view in which the smartphone on which a smartphone cover is mounted is seen from the front.
Figure 33:
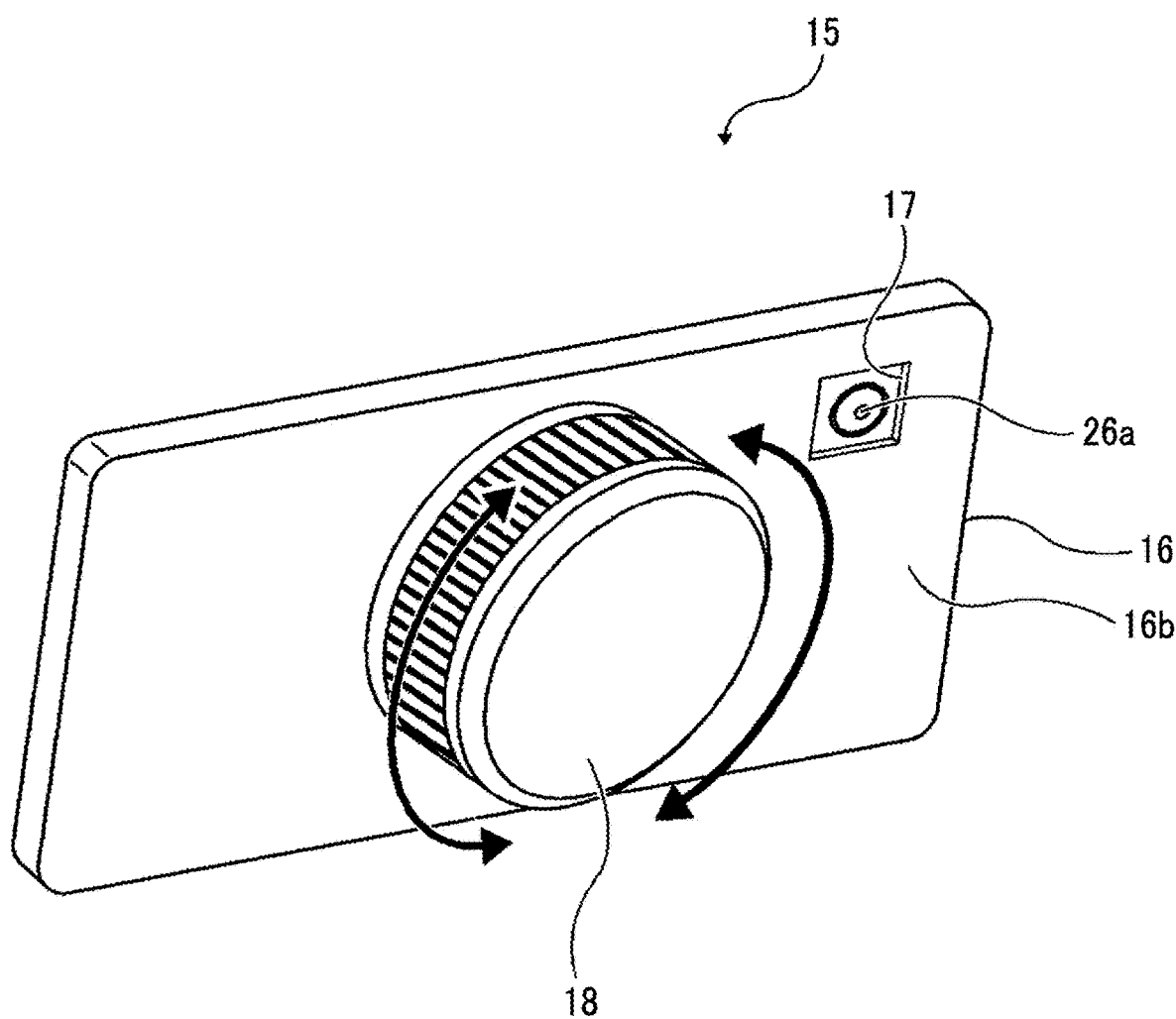
FIG. 33 is an external view in which the smartphone on which the smartphone cover is mounted is seen from the rear.

As illustrated in FIG. 32 and FIG. 33, in the present embodiment, the smartphone 10 is combined with a smartphone cover 15.

The smartphone cover 15 comprises a cover unit 16 and a ring-type controller 18. The cover unit 16 engages with the smartphone 10. In the cover unit 16, an opening 17 for exposing the imaging lens 26a of the smartphone 10 in a case where the smartphone 10 is engaged is formed. In addition, the ring-type controller 18 is attached to a rear surface 16b of the cover unit 16 in a rotatable manner with respect to the cover unit 16.

The ring-type controller 18 is rotatable with respect to the cover unit 16 like a zoom ring of a general digital camera and functions as an interface for the zoom magnification changing operation and for the display magnification changing operation in the smartphone 10. A detection unit, not illustrated, that detects a rotation direction and a rotation angle of the ring-type controller 18 is comprised inside the ring-type controller 18. Signals indicating the rotation direction and the rotation angle of the ring-type controller 18 detected by the detection unit are transmitted to the smartphone 10 by a communication unit, not illustrated. The communication unit uses standards such as Bluetooth (registered trademark).

Figure 34:
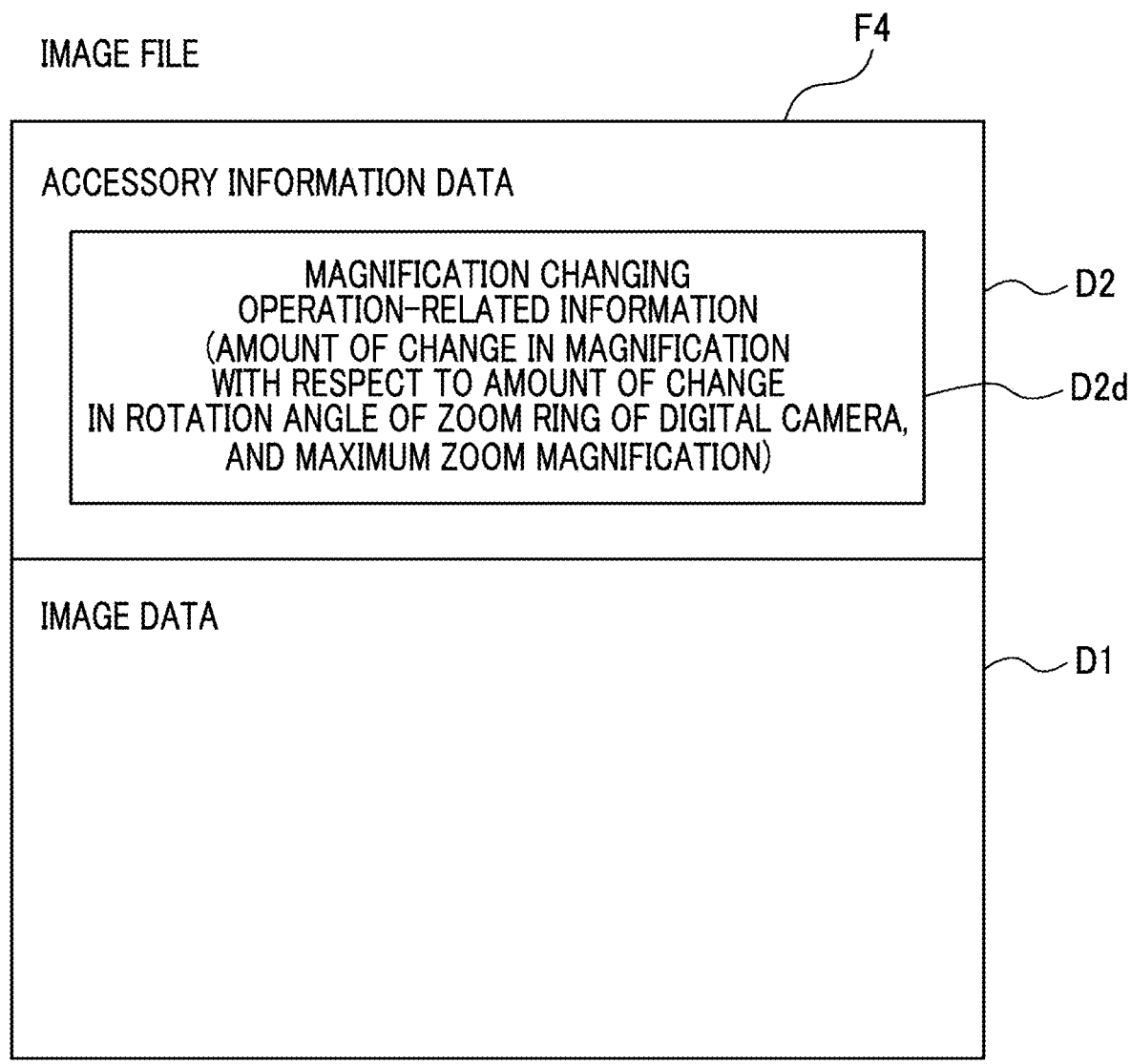
FIG. 34 is a diagram for describing a structure of an image file in a seventh embodiment.

As illustrated in FIG. 34, an image file F4 of the image handled in the present embodiment has the accessory information data D2 in addition to the image data D1. The accessory information data D2 includes, in addition to the information such as the capturing date and time of the image and the capturing location of the image, magnification changing operation-related information D2d related to the amount of change in the magnification with respect to the operation amount of the magnification changing operation in a case of imaging in the imaging apparatus that has captured the image. In the present embodiment, a case where information about an amount of change in the magnification with respect to an amount of change in a rotation angle of a zoom ring of a digital camera that has captured the image, and information about the maximum zoom magnification of the digital camera are recorded for the magnification changing operation-related information D2d will be described as an example.

Images stored in the storage 23 of the smartphone 10 of the image display system are not necessarily limited to images captured by the smartphone 10. In a case where the imaging apparatus that has captured the image is a digital camera, the sense of operation in the zoom magnification changing operation is different between the digital camera and the smartphone 10.

Generally, in the digital camera, the zoom magnification changing operation is performed by rotating the zoom ring. However, in the smartphone 10, the zoom magnification changing operation is performed by the swipe operation on the touch panel 24.

The smartphone cover 15 is a cover for performing the zoom magnification changing operation in the smartphone 10 with the same sense of operation as the digital camera.

In a case where mounting of the smartphone cover 15 on the smartphone 10 is sensed, the CPU 21 of the smartphone 10 causes the ring-type controller 18 of the smartphone cover 15 to function as an interface for the zoom magnification changing operation in the smartphone 10.

As a method of sensing the mounting of the smartphone cover 15 on the smartphone 10 in the CPU 21 of the smartphone 10, for example, establishment of communication between the communication unit 25 of the smartphone 10 and the communication unit of the ring-type controller 18 may be detected.

In addition, the CPU 21 of the smartphone 10 acquires, as the magnification changing operation-related information D2d, the information about the amount of change in the magnification with respect to the amount of change in the rotation angle of the zoom ring of the digital camera that has captured the image, and the information about the maximum zoom magnification of the digital camera from the accessory information data D2 of the image file F4 of the image to be displayed.

Figure 35:
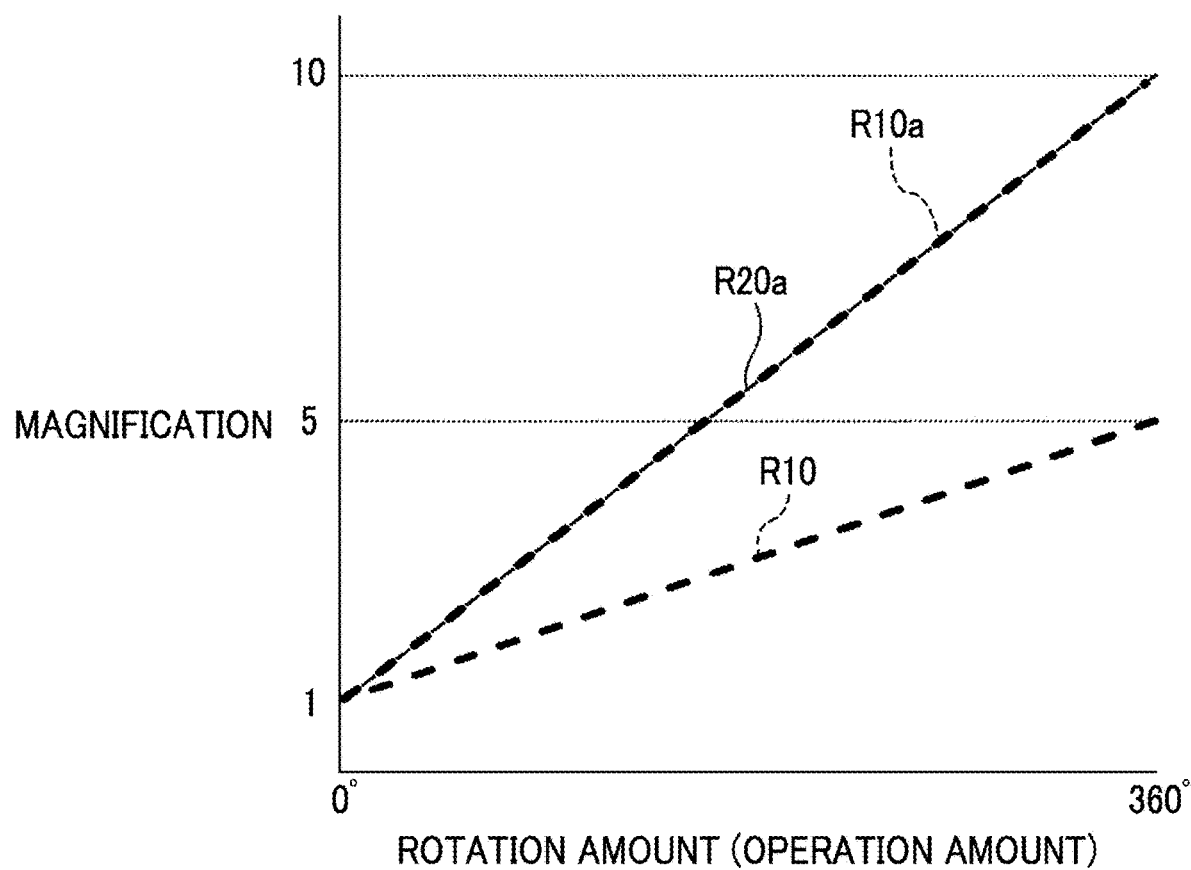
FIG. 35 is a graph showing a relationship between a rotation amount of a zoom ring or of a ring-type controller and the magnification.

FIG. 35 is a graph showing a relationship between a rotation amount (that is, an operation amount) of the zoom ring or of the ring-type controller 18 and the magnification in the zoom magnification changing operation. Here, a case where the zoom magnification is increased by a magnification of 1 each time the ring-type controller 18 is rotated clockwise by 90°, and where the maximum zoom magnification is a magnification of 5 for the smartphone 10 will be described as an example. In addition, a case where the zoom magnification is increased by a magnification of 1 each time the zoom ring is rotated clockwise by 40°, and where the maximum zoom magnification is a magnification of 10 for the digital camera that has captured the image will be described.

A relationship between the rotation amount (that is, the operation amount) of the ring-type controller 18 from a reference position (that is, a rotation amount of 0) and the amount of change in the zoom magnification in the smartphone 10 is shown in a graph R10. In addition, a position of a lower limit of the magnification of the zoom ring in the digital camera that has captured the image is set as a reference position (that is, a rotation amount of 0), and a relationship between the rotation amount (that is, the operation amount) from the reference position and the amount of change in the zoom magnification is shown in a graph R20.

The ring-type controller 18 rotates endlessly and can freely rotate any number of rotations in the same direction. Thus, the reference position of the ring-type controller 18 may be, for example, a position of the ring-type controller 18 when the image in an initial display state is displayed on the display unit 64.

As described above, the amount of change in the magnification with respect to the amount of change in the rotation angle of the zoom ring of the digital camera that has captured the image is different from that of the ring-type controller 18 mounted on the smartphone 10. In addition, the maximum zoom magnification of the digital camera that has captured the image is different from that of the smartphone 10. Thus, even in a case where operations of the same operation amount are performed in the zoom magnification changing operation, the amounts of change in the zoom magnification do not match.

Thus, the CPU 21 of the smartphone 10 performs processing of matching the amount of change in the zoom magnification with respect to the operation amount of the zoom magnification changing operation in the digital camera that has captured the image to the amount of change in the zoom magnification with respect to the operation amount of the zoom magnification changing operation in the smartphone 10, based on the information about the amount of change in the magnification with respect to the amount of change in the rotation angle of the zoom ring of the digital camera that has captured the image, and on the information about the maximum zoom magnification of the digital camera. Specifically, as shown in a graph R10a in FIG. 30, the zoom magnification is set to be increased by a magnification of 1 each time an operation input of the ring-type controller 18 mounted on the smartphone 10 is clockwise rotation by 40°. In addition, the maximum zoom magnification is set to a magnification of 10.

Such an aspect can make the sense of operation in the zoom magnification changing operation in the smartphone 10 approach the sense of operation of the digital camera that has captured the image.

Eighth Embodiment

Next, an eighth embodiment of the present disclosure will be described. An image display system according to the eighth embodiment is different from the first embodiment in that a scroll amount in a case of scrolling the image in accordance with the second operation instruction is corrected in the display control processing in the CPU 21 of the smartphone 10. In the present embodiment, hardware configurations of the smartphone 10 and the smart glasses 50 are the same as in the first embodiment and thus, will not be described.

Figure 36:
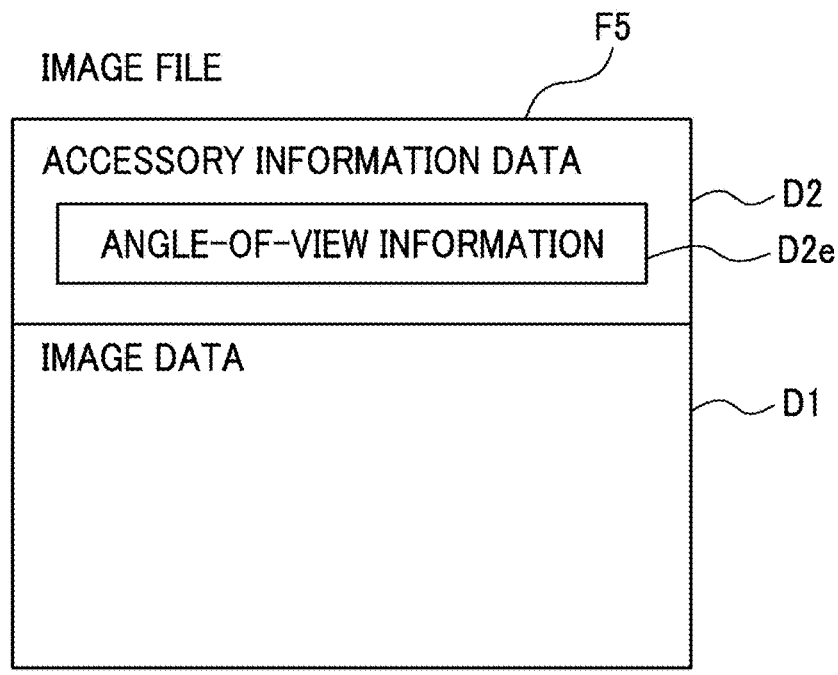
FIG. 36 is a diagram for describing a structure of an image file in an eighth embodiment.

As illustrated in FIG. 36, an image file F5 of the image IM handled in the present embodiment has the accessory information data D2 in addition to the image data D1. The accessory information data D2 includes, in addition to the information such as the capturing date and time of the image and the capturing location of the image, angle-of-view information D2e related to an angle of view of the smartphone 10 in capturing the image.

The angle-of-view information D2e may be information with which the angle of view of the smartphone 10 in imaging can be specified. The angle-of-view information D2e may be information about the angle of view or may be information about the zoom magnification corresponding to the angle of view. In a case of acquiring the information about the zoom magnification, information about the angle of view corresponding to the zoom magnification may be separately acquired. Here, the angle-of-view information D2e is an angle of view of an imaging region as an example.

Figure 37:
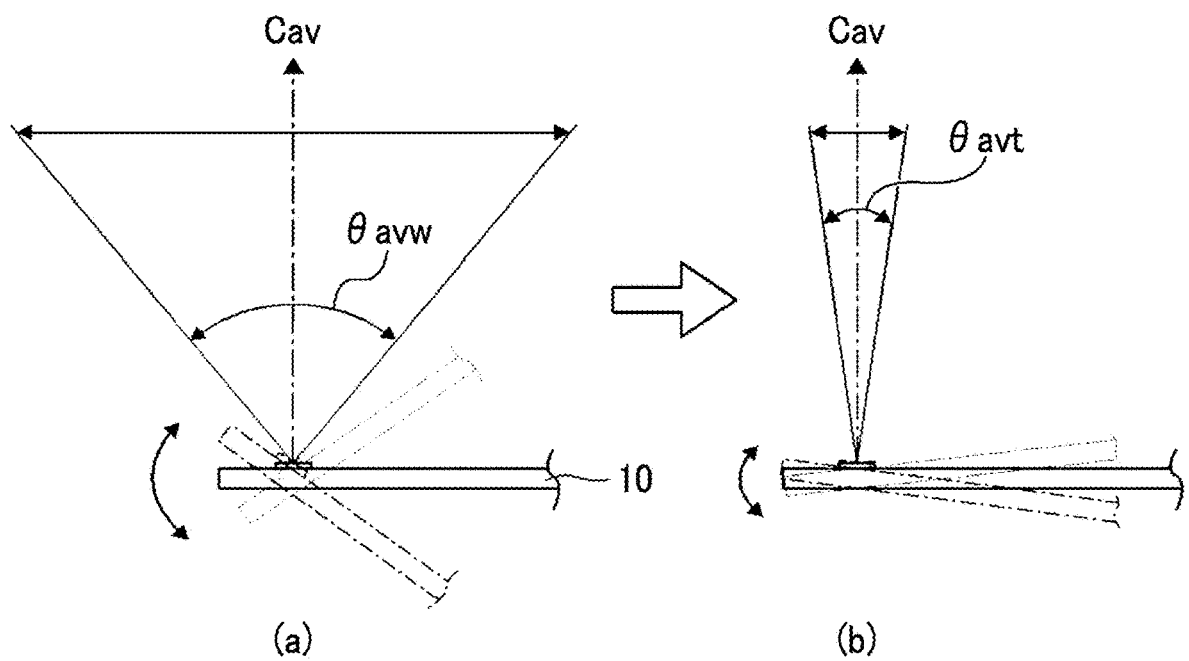
FIG. 37 is a diagram for describing a relationship between an angle of view and an inclination angle of the smartphone.

As illustrated in FIG. 37, an angle of view θavw of the smartphone 10 at the wide angle end (that is, the zoom magnification is a magnification of 1) in capturing the image is greater by a factor of 5 than an angle of view θavt at the telephoto end (that is, the zoom magnification is a magnification of 5). In addition, as the angle of view in capturing the image is increased, an inclination angle of the smartphone 10 necessary for changing the direction of the imaging lens 26a from one end to the other end of an imaging range is increased. As in the above example, in a case where the angle of view is increased by a factor of 5, the inclination angle of the smartphone 10 necessary for changing the direction of the imaging lens 26a from one end to the other end of the imaging range is increased by a factor of 5.

In a case of executing the display control processing of scrolling the image displayed on the display unit 64 of the smart glasses 50 in accordance with the second operation instruction, the CPU 21 of the smartphone 10 corrects the scroll amount of the image based on the angle-of-view information D2e in imaging.

Specifically, the scroll amount of the image is corrected such that the inclination angle of the smartphone 10 necessary for scrolling from one end to the other end of the image in a case of displaying the image matches the inclination angle of the smartphone 10 necessary for changing the direction of the imaging lens 26a from one end to the other end of the imaging range in a case of capturing the image.

Such an aspect can reproduce, in a case of scrolling the image, a sense similar to a change in the imaging region in a case where the smartphone 10 is inclined in a case of capturing the image.

Modification Example

While the present disclosure is described above based on preferred embodiments, embodiments to which the present disclosure can be applied are not limited to the above embodiments.

Figure 38:
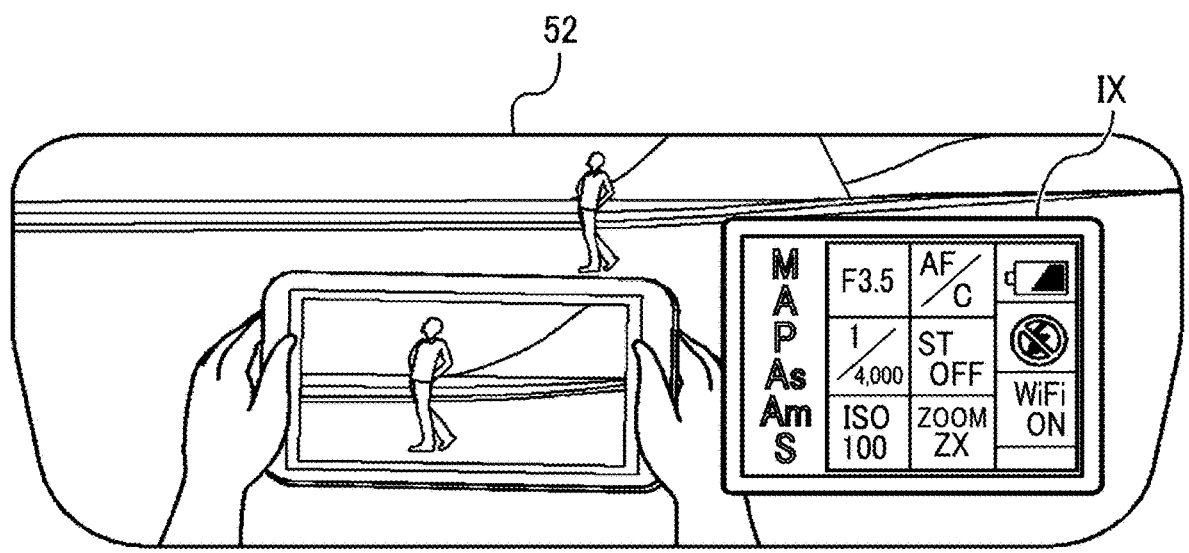
FIG. 38 is a diagram illustrating an example of an image displayed on the smart glasses in imaging.

For example, while a case where the user U performs imaging using only the smartphone 10 without wearing the smart glasses 50 in a case of capturing the image is described in the embodiments, the user U may perform imaging in a state of wearing the smart glasses 50 in a case of capturing the image. In this case, as illustrated in FIG. 38, setting information in imaging of the smartphone 10 may be additionally displayed in an image IX displayed in a part of the field of view of the right eye. Regarding content to be displayed in the image IX, a live view of the smartphone 10 may be displayed in addition to the setting information in imaging. The live view of the smartphone 10 and the setting information may be displayed in a superimposed manner.

In addition, the smart glasses 50 are not limited to the display of the image in a part of the field of view of the right eye. The image may be displayed in a part of a field of view of a left eye, a part of the fields of view of both eyes, or the entire fields of view of both eyes.

In addition, the wearable monitor according to the embodiment of the disclosed technology is not limited to the smart glasses and may be other display devices such as a HMD.

In addition, the imaging apparatus according to the embodiment of the disclosed technology is not limited to the smartphone and may be a digital camera having the same functions as the smartphone 10.

In addition, processing executed by causing the CPU 21 and the CPU 61 to read software (program) in each embodiment may be executed by various processors other than the CPU. Examples of the processors in this case include a programmable logic device (PLD) such as a field-programmable gate array (FPGA) of which a circuit configuration can be changed after manufacture, and a dedicated electric circuit such as an application specific integrated circuit (ASIC) that is a processor having a circuit configuration dedicatedly designed to execute specific processing. In addition, each processing may be executed by one of the various processors or may be executed by a combination of two or more processors of the same type or different types (for example, a plurality of FPGAs and a combination of a CPU and a FPGA). In addition, a hardware structure of the various processors is more specifically an electric circuit in which circuit elements such as semiconductor elements are combined.

In addition, while an aspect of storing (installing) the display control program in the storage 23 or in the storage 63 in advance is described in each embodiment, the disclosed technology is not limited thereto. The program may be provided in the form of a recording on a recording medium such as a compact disk read only memory (CD-ROM), a digital versatile disk read only memory (DVD-ROM), and a universal serial bus (USB) memory. In addition, the program may be in the form of a download from an external apparatus through a network.

In addition, the term ROM is a broad concept including a flash memory, an erasable programmable read only memory (EPROM), an electrically erasable programmable read only memory (EEPROM), and the like that are rewritable-type ROMs.

In addition, in the first to fifth embodiments, the CPU is provided to be integrated inside the wearable device or is provided to be integrated in the smartphone. However, the CPU may be provided on a network connected to the wearable device or to the smartphone, in an operating unit connected to a network, or in a cloud computing unit connected to a network.

In a case where the CPU is provided on a network or in an apparatus connected to a network, it is desirable that the network is managed by a cloud system, and the CPU connected to the network operates as a CPU virtually incorporated in the wearable device or in the smartphone through the network using cloud computing technology.

A case where changing of the display magnification or scrolling is necessary because of a difference between the resolution of the captured image and the resolution of the display image is described in each embodiment. In addition to this, there is also a case where changing of the display magnification or scrolling is necessary because of a difference in aspect ratio in panoramic imaging or the like, or a case where changing of the display magnification or scrolling is necessary because of a difference between a resolution of an image generated by interpolating processing, rendering, or the like instead of the resolution of the captured image, and the resolution of the display image. Even in these cases, the same effects as in the embodiments are obtained.

While the wearable monitor that is an example of the wearable device comprising the monitor does not comprise a camera in the embodiments, the wearable monitor may further comprise a camera and be able to perform imaging alone without being combined with the imaging apparatus. In this case, it is preferable that imaging by the camera on the imaging apparatus side can also be performed in a case where the wearable monitor is combined with the imaging apparatus.

The above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, of course, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and to facilitate understanding of the parts according to the embodiment of the disclosed technology.

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging device including a monitor and an imaging unit, the imaging device comprising:
   a processor:
   a ring operation member that is rotatably operable;
   a detector that is configured to detect rotation of the ring operation member as a signal; and
   a communication unit that is configured to communicate the signal detected by the detector to a wearable device, the signal being used for display control of the wearable device,
   wherein the signal comprises at least one of a signal associated with a setting of imaging conditions of the imaging unit, or a signal associated with a display setting of an image displayed on the monitor,
   wherein the signal comprises a signal indicating an operation amount of the ring operation member, and
   the processor is configured to:
   acquire an image to be displayed on the monitor, wherein the image includes magnification changing operation-related information related to an amount of change in magnification with respect to an operation amount of the magnification changing operation performed in an imaging at an imaging apparatus that has captured the image,
   determine an amount of change in a display magnification of the image based on the operation amount indicated by the signal, and
   match the amount of change in the magnification with respect to the operation amount of the magnification changing operation performed in the imaging, to an amount of change in magnification with respect to an operation amount of the ring operation member when changing the display magnification of the image, based on the magnification changing operation-related information.

2. The imaging device according to claim 1, further comprising a cover member that is configured to engage with the imaging device,
   wherein the ring operation member is rotatably attached to the cover member.

3. The imaging device according to claim 1, wherein the imaging conditions comprise a magnification of imaging at the imaging unit.

4. The imaging device according to claim 1, wherein the display setting of the image comprises a display magnification of the image.

5. The imaging device according to claim 1,
wherein the cover member is configured to engage with the imaging unit, and
the processor is configured to control at least one of the setting of the imaging conditions of the imaging unit, or the display setting of the image displayed on the monitor, in a case in which it is detected that the cover member is engaged with the imaging unit.

6. The imaging device according to claim 5, wherein the processor is further configured to detect that the cover member is engaged with the imaging unit by detecting that a communication has been established with the imaging unit.

7. An imaging system comprising:
a processor;
a wearable device including a display; and
an imaging device including a monitor and an imaging unit, the imaging device comprising:
    a ring operation member that is rotatably operable;
    a detector that is configured to detect rotation of the ring operation member as a signal; and
    a communication unit that is configured to communicate the signal detected by the detector to a wearable device, the signal being used for display control of the wearable device,
wherein the processor is configured to send, to the wearable device, a signal related to at least one of settings of imaging conditions of the imaging unit or display settings of an image displayed on the monitor,
wherein the signal comprises a signal indicating an operation amount of the ring operation member, and
the processor is further configured to:
acquire an image to be displayed on the monitor, wherein the image includes magnification changing operation-related information related to an amount of change in magnification with respect to an operation amount of the magnification changing operation performed in an imaging at an imaging apparatus that has captured the image,
determine an amount of change in a display magnification of the image based on the operation amount indicated by the signal, and
match the amount of change in the magnification with respect to the operation amount of the magnification changing operation performed in the imaging, to an amount of change in magnification with respect to an operation amount of the ring operation member when changing the display magnification of the image, based on the magnification changing operation-related information.

* * * * *